(12) United States Patent
Suzuki et al.

(10) Patent No.: US 8,190,599 B2
(45) Date of Patent: May 29, 2012

(54) STREAM DATA PROCESSING METHOD AND SYSTEM

(75) Inventors: Naohiro Suzuki, Yokohama (JP); Naoki Ikawa, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 290 days.

(21) Appl. No.: 12/631,255

(22) Filed: Dec. 4, 2009

(65) Prior Publication Data

US 2010/0153363 A1 Jun. 17, 2010

(30) Foreign Application Priority Data

Dec. 12, 2008 (JP) ................. 2008-317409

(51) Int. Cl.
*G06F 7/00* (2006.01)
(52) U.S. Cl. ..................................... 707/719
(58) Field of Classification Search ........................ None
See application file for complete search history.

(56) References Cited

U.S. PATENT DOCUMENTS

| | | | |
|---|---|---|---|
| 5,495,600 A | | 2/1996 | Terry et al. |
| 5,734,642 A | * | 3/1998 | Vaishnavi et al. ............ 370/255 |
| 7,024,671 B2 | | 4/2006 | Yamashita |
| 7,403,959 B2 | | 7/2008 | Nishizawa et al. |
| 2008/0016095 A1 | * | 1/2008 | Bhatnagar et al. ............ 707/101 |
| 2008/0256146 A1 | | 10/2008 | Nishizawa et al. |

FOREIGN PATENT DOCUMENTS

| | | |
|---|---|---|
| JP | 6-052230 A | 2/1994 |
| JP | 2002-007364 | 1/2002 |
| JP | 2006-338432 A | 12/2006 |

OTHER PUBLICATIONS

Vision and Activities for Massive and High Speed Data Processing Technologies Toward Information Explosion Era; Hitachi Hyoron, vol. 9 No. 7; Jul. 1, 2008; pp. 1-7.

* cited by examiner

*Primary Examiner* — Truong Vo
(74) *Attorney, Agent, or Firm* — Foley & Lardner LLP

(57) ABSTRACT

An operation management program collects a query status table of a migration-source agent processing program and creates a server status table. The operation management program, based on the server status table, computes a migration cost for each query, and selects the query with the smallest migration cost as a migration query. Then, the operation management program migrates the selected query, using the optimum migration method.

18 Claims, 26 Drawing Sheets

FIG. 2

| STREAM ID | TRANSMISSION DESTINATION IP ADDRESS |
|---|---|
| S1 | 192.168.0.2 |
| S2 | 192.168.0.2 |
| S3 | 192.168.0.2 |

FIG. 3

EXAMPLE OF TIME-BASED QUERY

```
SELECT AVG(S1.data)
FROM S1[RANGE 30 seconds]
```

EXAMPLE OF NUMBER-BASED QUERY

```
SELECT AVG(S1.data)
FROM S1[ROWS 5]
```

FIG. 4

| QUERY ID | QUERY STRING | QUERY EXECUTION FORMAT STORAGE DESTINATION | EXECUTION-TARGETED STREAM ID |
|---|---|---|---|
| Q1 | SELECT AVG(S1.data) FROM S1[RANGE 1 minutes] | 0x7FFFAEE1 | S1 |
| Q2 | SELECT AVG(S2.data) FROM S2[RANGE 10 seconds] | 0x21FCD123 | S2 |
| Q3 | SELECT AVG(S3.data) FROM S3[ROWS 100] | 0x582FAB2A | S3 |

FIG. 5

| QUERY ID 127 | CPU UTILIZATION RATE (%) 129 | WINDOW SIZE 131 | DATA INPUT FREQUENCY (NUMBER/SECOND) 133 |
|---|---|---|---|
| Q1 | 50 | 1 MINUTE | 10 |
| Q2 | 30 | 10 SECONDS | 100 |
| Q3 | 20 | 100 | 50 |

FIG. 6

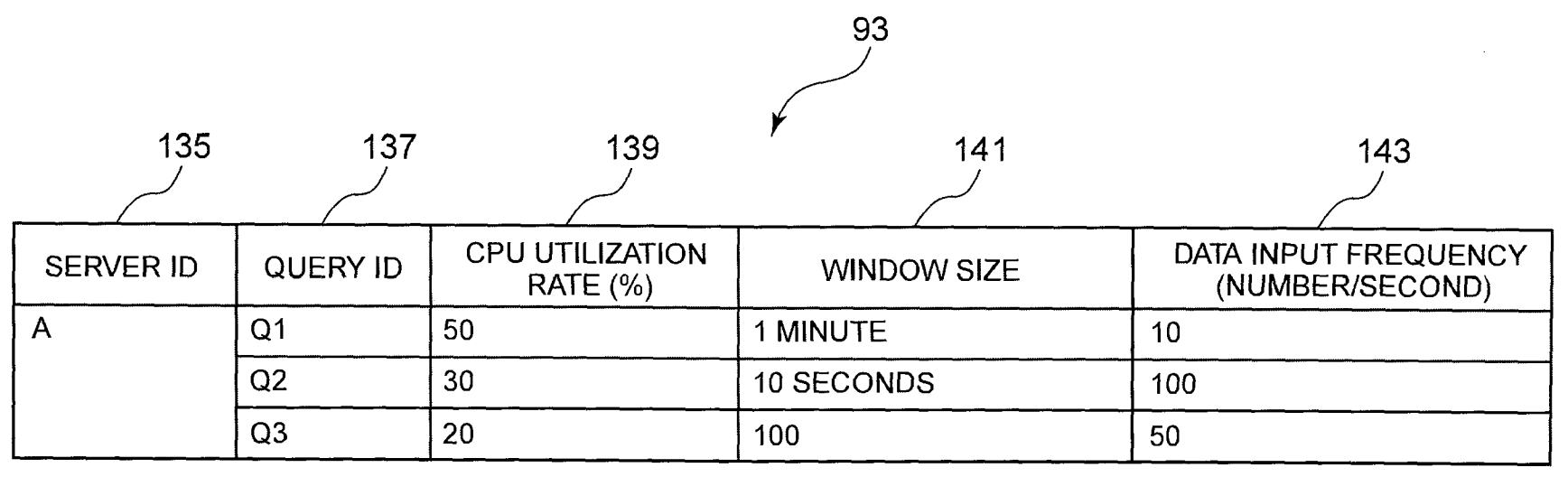

| SERVER ID | QUERY ID | CPU UTILIZATION RATE (%) | WINDOW SIZE | DATA INPUT FREQUENCY (NUMBER/SECOND) |
|---|---|---|---|---|
| A | Q1 | 50 | 1 MINUTE | 10 |
| | Q2 | 30 | 10 SECONDS | 100 |
| | Q3 | 20 | 100 | 50 |

FIG. 7

| SERVER ID | QUERY ID | CPU UTILIZATION RATE (%) | MIGRATION TIME (ESTIMATE) |
|---|---|---|---|
| A | Q1 | 50 | 60 SECONDS |
| | Q2 | 30 | 10 SECONDS |
| | Q3 | 20 | 2 SECONDS |

FIG. 13

| STREAM ID | IP ADDRESS OF TRANSMISSION-DESTINATION STREAM DATA PROCESSING PROGRAM |
|---|---|
| S1 | 192.168.0.2 |
| S2 | 192.168.0.2 |
| S3 | 192.168.0.2 |
| S4 | 192.168.0.3 |
| S5 | 192.168.0.3 |

| QUERY ID | CPU UTILIZATION RATE (%) | WINDOW DATA RANGE | DATA INPUT FREQUENCY (NUMBER/SECONDS) |
|---|---|---|---|
| Q4 | 45 | 300 | 1 |
| Q5 | 40 | 5 SECONDS | 25 |

| SERVER ID | QUERY ID | CPU UTILIZATION RATE (%) | WINDOW DATA RANGE | DATA INPUT FREQUENCY (NUMBER/SECONDS) |
|---|---|---|---|---|
| A | Q1 | 50 | 1 MINUTE | 10 |
|   | Q2 | 30 | 10 SECONDS | 100 |
|   | Q3 | 20 | 100 | 50 |
| B | Q4 | 45 | 300 | 1 |
|   | Q5 | 40 | 5 SECONDS | 25 |

| SERVER ID | QUERY ID | CPU UTILIZATION RATE (%) | MIGRATION TIME (ESTIMATE) |
|---|---|---|---|
| A | Q1 | 50 | 60 SECONDS |
| | Q2 | 30 | 10 SECONDS |
| | Q3 | 20 | 2 SECONDS |
| B | Q4 | 45 | 300 SECONDS |
| | Q5 | 40 | 5 SECONDS |

FIG. 20

| QUERY ID | CPU UTILIZATION RATE (%) | IN-WINDOW DATA (MB) | OPERATION NETWORK BANDWIDTH (MB/SECOND) | WINDOW DATA RANGE | DATA INPUT FREQUENCY (NUMBER/SECOND) | ALLOWABLE DELAY TIME (SECONDS) |
|---|---|---|---|---|---|---|
| Q1 | 50 | 20 | 2.5 | 1 MINUTE | 10 | 1 |
| Q2 | 30 | 10 | | 10 SECONDS | 100 | 10 |
| Q3 | 20 | 30 | | 100 | 50 | 5 |

FIG. 21

| SERVER ID | QUERY ID | CPU UTILIZATION RATE (%) | IN-WINDOW DATA (MB) | OPERATION NETWORK BANDWIDTH (MB/SECOND) | WINDOW DATA RANGE | DATA INPUT FREQUENCY (NUMBER/SECOND) | ALLOWABLE DELAY TIME (SECONDS) |
|---|---|---|---|---|---|---|---|
| A | Q1 | 50 | 20 | 2.5 | 1 MINUTE | 10 | 1 |
| | Q2 | 30 | 10 | | 10 SECONDS | 100 | 10 |
| | Q3 | 20 | 30 | | 100 | 50 | 5 |

FIG. 22

| SERVER ID | QUERY ID | CPU UTILIZATION RATE (%) | MIGRATION TIME (ESTIMATE) | | ALLOWABLE DELAY TIME (SECONDS) |
|---|---|---|---|---|---|
| | | | WARM-UP METHOD | COPY METHOD | |
| A | Q1 | 50 | 60 SECONDS | 8 SECONDS | 1 |
| | Q2 | 30 | 10 SECONDS | 4 SECONDS | 10 |
| | Q3 | 20 | 2 SECONDS | 12 SECONDS | 5 |

STREAM DATA PROCESSING METHOD AND SYSTEM

CROSS-REFERENCE TO PRIOR APPLICATION

This application relates to and claims the benefit of priority from Japanese Patent Application number 2008-317409, filed on Dec. 12, 2008 the entire disclosure of which is incorporated herein by reference.

BACKGROUND

The present generally invention relates to a stream data processing method and system comprising at least one or more first information processing apparatuses that are actually executing data processing based on one or a plurality of pre-registered queries with respect to inputted stream data, and at least one or more second information processing apparatuses that constitute, from the above-mentioned first information processing apparatus, the migration destination of any of the queries actually executing the data processing in the above-mentioned first information processing apparatus.

Data, called stream data, which must be processed instantaneously and continuously, has been increasing in information processing technology fields in recent years. Stream data is continuously created and arrives from one moment to the next in an endless stream. Some examples of stream data are the information read from RFID tags, sensor node monitoring information, and stock price information.

An apparatus designed to make it possible to efficiently carry out queries when selected information is being continuously fetched from a database system was proposed in the past. The continuous query apparatus related to this proposal is constituted such that a text that was loaded from either a local or remote external source is parsed into one set of indexed fields capable of being referenced using a query, and a group of continuous queries with respect to the above-mentioned text is executed (for example, refer to Japanese Patent Application Laid-open No. H6-052230).

Further, technology designed to enhance the availability and reliability of a stream data processing system, and to enable this system to maintain real-time processing capabilities even under increased loads was also proposed in the past. This proposal relates to a stream data processing system as the preferred data processing system for processing data, the real-time nature of which is vital. This proposal discloses a configuration that replicates and archives either all or a portion of the stream data in a nonvolatile storage medium, and makes it possible to seamlessly use the real-time data and the archived data, and a configuration that associates a plurality of stream data processing systems and enhances the performance of query (a command that designates the nature of a process or instruction) processing (For example, refer to Japanese Patent Laid-open Publication No. 2006-338432).

SUMMARY

A stream data processing system differs from so-called stock data processing systems typified by a conventional database management system (DBMS), and first registers a query in the system and sequentially processes data that arrives in this system (the stream data processing system) in accordance with this query. Then, to realize real-time processing, when executing a query, the stream data processing system stipulates, in accordance with a concept called a sliding window, a range of processing-targeted data from a data group that has arrived in this system. A sliding window as used here refers to a data accumulation area for storing data, which is set inside the query, and which is the target of processing. The stream data clipped in accordance with the above-mentioned sliding window, for example, is stored in the memory of a machine, and is used when this machine's processor executes the query. Furthermore, the CQL (Continuous Query Language) described in the above-mentioned Japanese Patent Laid-open Publication No. 2006-338432 may be cited as a preferred example of a query language comprising a sliding window specification.

The use of stream data processing systems in fields that require real-time processing, such as financial applications, transportation information systems, and computer system management is promising. However, in a conventional stream data processing system, query processing can either be delayed or suspended when the load on the system rises in line with increases in the quantity of stream data, and when trouble like this actually occurs, the real-time data processing capabilities of the above-mentioned system are lost.

Accordingly, in view of the foregoing, a technique called scale-out has been proposed. A scale-out is a technique that disperses the load on a computer by adding a new computer (machine), which is separate from the computer (machine) that is actually executing a query, and migrating a portion of the above-mentioned query to the newly added computer from the above-mentioned query-executing computer. Employing this scale-out in a stream data processing system makes it possible to realize the guaranteed real-time data processing capabilities of the above-mentioned system. The steps of a scale-out process carried out in a stream data processing system will be explained below.

First, the inputting of data from the data transmission source is temporarily suspended to the migration-source computer, i.e. the computer on which a plurality of queries are actually being executed. Then, in addition to one or more queries to be migrated to the migration-destination computer, i.e. the newly added computer, being selecting from among this plurality of queries, stream data clipped in accordance with the sliding window inside each selected query is copied to the migration-destination computer. When the above-mentioned copy is complete, the transmission destination of the above-mentioned data is switched from the migration-source computer to the migration-destination computer, and, in addition, the above-mentioned migrated query is deleted from the migration-source computer. The scale-out process in the stream data processing method ends with the above. The reason for copying the data clipped in accordance with the sliding window is because the processing results will be changed by the (stream) data clipped by the sliding window in the stream data process. Hereinafter, the method for copying the (stream) data clipped by the sliding window to the migration-destination computer will be called the copy method (that is, the method for copying the stream data that is stored in the sliding window to the scale-out target computer).

However, in the above-described copy method, the concern is that since the query processing in the migration-source computer must be suspended while the (stream) data clipped by the sliding window is being copied, a delay occurs in the processing (of the stream data). As is clear from the above explanation, real-time capabilities are extremely important in the stream data process, and a delay in (stream data) processing at scale-out is a problem in that it is not possible to maintain the performance required in this data processing. Therefore, the problem is that it becomes impossible to apply the above-mentioned copy method to mission critical requirements (i.e., like financial system requirements that must be carried out unsuspended 24-hours-a-day, 365-days a year).

Further, there are cases in which the scale-out process is executed when processing performance required in an operating computer is insufficient, making it desirable to complete a scale-out in the shortest time possible and rapidly secure the needed processing performance in this computer. However, the problem is that the time needed to migrate data from the migration-source computer to the migration-destination computer differs for each query, and that it is difficult for the operator to ascertain the query for which a scale-out will end in a short period of time from among a large number of queries.

As described above, the challenge in the past has been to develop a technique that makes it possible to carry out scale-out without causing a delay in processing in order to provide a stream data processing system that is capable of being applied to a system with a mission critical requirement. Another challenge has been the development of a technique that makes it possible for a user to detect a query capable of undergoing scale-out in a short period of time from among a large number of queries.

Therefore, a first object of the present invention is to make it possible to easily detect a query capable of being migrated from the migration-source machine to the migration-destination machine in a short period of time and to carry out scale-out in a migration method that does not cause a delay of processing in a stream data processing system.

Further, a second object of the present invention is to make it possible to detect in the stream data processing system a query for which a migration is capable of being carried out (from a machine that is actually being operated to another (inactive) machine) in a short period of time regardless of the method for migrating the query from the machine that is actually being operated to the other (inactive) machine, and furthermore, to carry out a scale-out in the stream data processing system by selecting the optimum migration method for each query taking the wishes of the user into account.

A stream data processing system in accordance with a first aspect of the present invention comprises at least one or more first information processing apparatuses that are actually executing data processing based on either one or a plurality of pre-registered queries with respect to inputted stream data, and at least one or more second information processing apparatuses that constitute, from the above-mentioned first information processing apparatus, a migration destination of any of the queries actually executing the data processing in the above-mentioned first information processing apparatus, and further has a query status collection unit that collects information related to a definition structure of the above-mentioned inputted query and an execution status of the above-mentioned query, a migration cost computation unit that computes the cost of migrating the above-mentioned query on the basis of the information related to the above-mentioned definition structure and the above-mentioned execution status collected by the above-mentioned query status collection unit, a migration query decision unit that decides a query to be migrated to the above-mentioned second information processing apparatus from among the queries being executed in the above-mentioned first information processing apparatus based on the migration cost computed by the above-mentioned migration cost computation unit, and a query migration execution unit that migrates the query, which has been decided to migrate by the above-mentioned migration query decision unit, from the above-mentioned first information processing apparatus to the above-mentioned second information processing apparatus using a pre-set query migration method.

The stream data processing system in accordance with a second aspect of the present invention comprises at least one or more first information processing apparatuses that are actually executing data processing based on either one or a plurality of pre-registered queries with respect to inputted stream data, and at least one or more second information processing apparatuses that constitute, from the above-mentioned first information processing apparatus, the migration destination of any of the queries actually executing the data processing in the above-mentioned first information processing apparatus, and further has a query status collection unit that collects information related to the definition structure of the above-mentioned inputted query and the execution status of the above-mentioned query, a migration cost computation unit that computes the cost of migrating the above-mentioned query on the basis of the information related to the above-mentioned definition structure and the above-mentioned execution status collected by the above-mentioned query status collection unit, a query migration method selection unit that selects, from among a plurality of types of pre-set query migration methods, a query migration method when migrating each query from the above-mentioned first information processing apparatus to the above-mentioned second information processing apparatus based on the migration cost computed by the above-mentioned migration cost computation unit, a migration query decision unit that decides a query to be migrated to the above-mentioned second information processing apparatus from among the queries being executed in the above-mentioned first information processing apparatus based on the query migration method selected by the above-mentioned query migration method selection unit and the migration cost computed by the above-mentioned migration cost computation unit, and a query migration execution unit that migrates the query, which has been decided to migrate by the above-mentioned migration query decision unit, from the above-mentioned first information processing apparatus to the above-mentioned second information processing apparatus, in accordance with the query migration method selected by the above-mentioned query migration method selection unit.

In a preferred embodiment related to either the first aspect or the second aspect of the present invention, the information related to the above-mentioned query definition structure is a window size of the above-mentioned query.

In a separate embodiment from the above, the information related to the execution status of the above-mentioned query is a data input frequency, which is information on the quantity of the above-mentioned stream data inputted per unit of time for each of the above-mentioned queries.

Further, in a separate embodiment from the above, the above-mentioned migration cost is based on an estimated migration time, which is time required to migrate the above-mentioned query from the above-mentioned first information processing apparatus to the above-mentioned second information processing apparatus, and the above-mentioned migration cost computation unit computes the above-mentioned estimated migration time for each of the above-mentioned queries on the basis of information related to the above-mentioned query definition structure and the above-mentioned query execution status.

Further, in a separate embodiment from the above, the above-mentioned migration cost computation unit computes as the above-mentioned estimated migration time a value obtained by dividing the value of the above-mentioned query window size by the value of the above-mentioned data input frequency.

Further, a separate embodiment from the above further comprises a resource information collection unit that collects resource information related to the above-mentioned first information processing apparatus in which the above-mentioned query is registered.

Further, in a separate embodiment from the above, the above-mentioned resource information comprises at least one of the CPU utilization rate of the above-mentioned first information processing apparatus for each of the above-mentioned queries and the main memory utilization rate of the above-mentioned first information processing apparatus for each of the above-mentioned queries.

Further, in a separate embodiment from the above, the above-mentioned migration query decision unit decides one or more queries that satisfy a specific condition as the query to be migrated from the above-mentioned first information processing apparatus to the above-mentioned second information processing apparatus based on the above-mentioned migration cost computed by the above-mentioned migration cost computation unit and the above-mentioned resource information.

Further, in a separate embodiment from the above, the specific condition for the above-mentioned migration query decision unit to select one or more queries is the selection of one or more queries in which the above-mentioned resource information is the CPU utilization rate of the above-mentioned first information processing apparatus in accordance with the above-mentioned query, the above-mentioned estimated migration time computed by the above-mentioned migration cost computation unit is short, and, in addition, the total value of the above-mentioned CPU utilization rates falls within a prescribed range.

Further, in a separate embodiment from the above, the above-mentioned migration cost computation unit computes the migration cost for each of the above-mentioned migration methods for the above-mentioned respective queries, and the above-mentioned query migration method selection unit determines a migration method for each of the queries based on the above-mentioned migration cost computed for each of the above-mentioned queries by the above-mentioned migration cost computation unit.

Further, in a separate embodiment from the above, for the above-mentioned query migration method selection unit, the optimum condition when a query determined for migration by the above-mentioned migration query decision unit is migrated from the above-mentioned first information processing apparatus to the above-mentioned second information processing apparatus, is that the fact that the above-mentioned estimated migration time computed by the above-mentioned migration cost computation unit is the shortest, and, in addition, the query to be migrated satisfies a specific condition.

In a separate embodiment from the above, the stream data processing system further comprises a window data size information collection unit that acquires information related to the data size of the window in the above mentioned respective queries.

Further, in a separate embodiment from the above, the above-mentioned plurality of types of query migration methods comprise a copy method for copying the stream data stored in the windows of the above-mentioned respective queries to the above-mentioned second information processing apparatus, and a warm-up method that sends the same stream data of a fixed period to a query registered in the above-mentioned first information processing apparatus and to a query migrated to the above-mentioned second information processing apparatus, both of which are the same query, and suspends processing related to the query of the above-mentioned first information processing apparatus at the point in time when the data contents in both queries match.

In a stream data processing method in accordance with a third aspect of the present invention, the stream data processing system comprises at least one or more first information processing apparatuses that are actually executing data processing based on one or a plurality of pre-registered queries with respect to inputted stream data, and at least one or more second information processing apparatuses that constitute, from the above-mentioned first information processing apparatus, the migration destination of any of the queries actually executing the data processing in the above-mentioned first information processing apparatus, the system data processing method comprising a first step of collecting information related to a definition structure of the above-mentioned inputted query and an execution status of the above-mentioned query, a second step of computing the cost of migrating the above-mentioned query based on the information related to the above-mentioned definition structure and the above-mentioned execution status collected in the above-mentioned first step, a third step of deciding a query to be migrated to the above-mentioned second information processing apparatus from among the queries being executed in the above-mentioned first information processing apparatus based on the migration cost computed in the above-mentioned second step, and a fourth step of migrating the query, which has been decided to migrate in the above-mentioned third step, from the above-mentioned first information processing apparatus to the above-mentioned second information processing apparatus in use of a pre-set query migration method.

In a stream data processing method in accordance with a fourth aspect of the present invention, the stream data processing system comprises at least one or more first information processing apparatuses that are actually executing data processing based on one or a plurality of pre-registered queries with respect to inputted stream data, and at least one or more second information processing apparatuses that constitute, from the above-mentioned first information processing apparatus, the migration destination of any of the queries actually executing the data processing in the above-mentioned first information processing apparatus, the stream data processing method comprising a first step of collecting information related to a definition structure of the above-mentioned inputted query and an execution status of the above-mentioned query, a second step of computing the cost of migrating the above-mentioned query based on the information related to the above-mentioned definition structure and the above-mentioned execution status collected in the above-mentioned first step, a third step of selecting, from among a plurality of types of pre-set query migration methods, a query migration method when migrating each query from the above-mentioned first information processing apparatus to the above-mentioned second information processing apparatus based on the migration cost computed in the above-mentioned second step, a fourth step of deciding a query to be migrated to the above-mentioned second information processing apparatus from among the queries being executed in the above-mentioned first information processing apparatus based on the migration cost computed in the above-mentioned second step and the query migration method selected in the above-mentioned third step, and a fifth step of migrating the query, which has been decided to migrate in the above-mentioned fourth step, from the above-mentioned first information processing apparatus to the above-mentioned second information processing apparatus in accordance with the query migration method selected in the above-mentioned third step.

The present invention makes it possible to easily detect a query capable of being migrated from the migration-source machine to the migration-destination machine in a short period of time and to carry out scale-out in a migration method that does not cause a delay of processing in a stream data processing system.

Further, the present invention makes it possible to detect in the stream data processing system a query for which a migration is capable of being carried out (from a machine that is actually being operated to another (inactive) machine) in a short period of time regardless of the method for migrating the query from the machine that is actually being operated to the other (inactive) machine, and furthermore, to carry out a scale-out in the stream data processing system by selecting the optimum migration method for each query taking the wishes of the user into account.

BRIEF DESCRIPTION OF THE DRAWINGS

FIG. 2 is a diagram showing an example of the configuration of a stream transmission table included in a stream transmission program depicted in FIG. 1;

FIG. 3 is a diagram showing descriptions of queries in the Stanford University STREAM System;

FIG. 4 is a diagram showing an example of the configuration of query management table included in the stream data processing program (query repository) depicted in FIG. 1;

FIG. 5 is a diagram showing an example of the configuration of a query status table included in an agent processing program depicted in FIG. 1;

FIG. 6 is a diagram showing an example of the configuration of a server status table included in an operation management program depicted in FIG. 1;

FIG. 7 is a diagram showing an example of the configuration of a cost table included in the operation management program depicted in FIG. 1;

FIG. 13 is a diagram showing the contents of a stream transmission table included in a stream transmission program in a case where there is a plurality of server computers targeted for scale-out in a stream data processing system related to the first embodiment of the present invention;

FIG. 14 is a diagram showing the contents of a query status table included in agent processing program of a server computer (a second server computer) that has been newly added with respect to an existing server computer (a first server computer) for realizing a scale-out process in the stream data processing system related to the first embodiment of the present invention;

FIG. 15 is a diagram showing an example of the configuration of a server status table included in an operation management program in a case where there is a plurality of stream data processing programs (migration-source stream data processing programs) targeted for scale-out processing;

FIG. 16 is a diagram showing an example of the configuration of a cost table included in an operation management program in a case where there is a plurality of stream data processing programs (migration-source stream data processing programs) targeted for scale-out processing;

FIG. 20 is a diagram showing an example of the configuration of a query status table included in the agent processing program depicted in FIG. 19;

FIG. 21 is a diagram showing an example of the configuration of a server status table included in the operation management program depicted in FIG. 19;

FIG. 22 is a diagram showing an example of the configuration of a cost table included in the operation management program depicted in FIG. 19;

DETAILED DESCRIPTION OF THE EMBODIMENTS

The embodiments of the present invention will be explained in detail below in accordance with the drawings.

Figure 1:
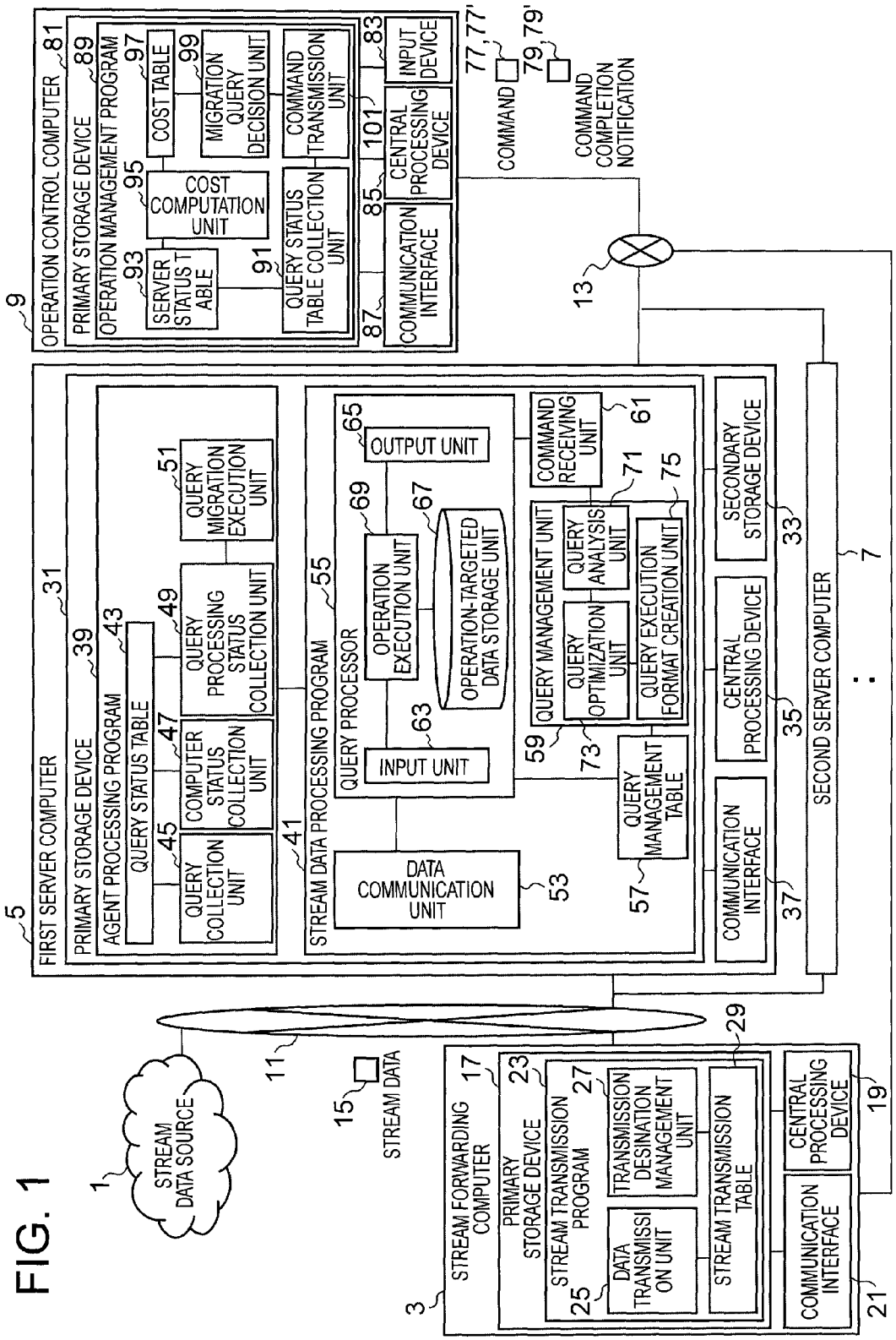
FIG. 1 is a functional block diagram showing the overall configuration of a stream data processing system related to a first embodiment of the present invention.

FIG. 1 is a functional block diagram showing the overall configuration of a stream data processing system related to a first embodiment of the present invention.

The above-mentioned stream data processing system, as shown in FIG. 1, comprises a stream data source 1, a stream forwarding computer 3, a first server computer 5, a second server computer 7, and an operation control computer 9. Then, the configuration is such that the stream data source 1 and the stream forwarding computer 3, the stream forwarding computer 3 and the first server computer 5, and the stream forwarding computer 3 and the second server computer 7 are all connected via a business network 11. Further, the configuration is such that the stream forwarding computer 3 and the operation control computer 9, the first server computer 5 and the operation control computer 9, and the second server computer 7 and the operation control computer 9 are all connected via a management network 13.

The stream data source 1, for example, has a function for sending stream data 15, which is information acquired from a variety of sensors and IC tags, or data such as stock price information that arrives from one moment to the next, to the stream forwarding computer 3 by way of the business network 11. In this embodiment, a character string called a stream ID is assigned to the stream data 15 sent from the stream data source 1. This character string (stream ID) is for identifying a query with respect to which this stream data 15 is to be processed, and the stream ID is set beforehand by the user. Furthermore, in this embodiment, any of S1, S2, and S3 are allocated as the stream ID for the acquired information, i.e. the stream data.

The stream forwarding computer 3 comprises a primary storage device 17, a central processing device 19, and a communication interface 21. The primary storage device 17 is for reading in a program under the control of the central processing device 19, and, for example, uses RAM (Random Access Memory). A stream transmission program 23 is loaded in the primary storage device 17. The stream transmission program 23, for example, is for sending the stream data 15 inputted to the stream forwarding computer 3 to the transmission destination (a server computer), and comprises a data transmission unit 25, a transmission-destination management unit 27, and a stream transmission table 29. The functions provided by the stream transmission program 23 will be explained in detail below.

The central processing device 19, for example comprises a CPU (Central Processing Unit), and is for executing various programs read into the main storage device 17. In this embodiment, the central processing device 19 executes the stream transmission program 23 read into the primary storage device 17 as shown in FIG. 1.

The communication interface 21 is used when the stream forwarding computer 3 carries out various data communications (information communication) with the stream data source 1, the first server computer 5 and the second server computer 7 over the business network 11. The communication interface 21 is also used when the stream forwarding computer 3 carries out various data communications (information communication) with the operation control computer 9 via the management network 13. In data communications with either the first server computer 5 or the second server computer 7, stream data 15 is respectively sent from the stream forwarding computer 3 to either the first server computer 5 or the second server computer 7.

In data communications with the operation control computer 9, a command 77 is sent from the operation control computer 9 to the stream forwarding computer 3. This command 77 comprises a command for adding a transmission destination (a server computer) and a command for deleting a transmission destination (a server computer). In data communications with the operation control computer 9, a command completion notification 79 denoting that the stream forwarding computer 3 received the above-mentioned command 77 and has completed a series of processes based on this command 77 is sent from the stream forwarding computer 3 to the operation control computer 9. The command 77 and the command completion notification 79 will be explained in detail below.

In this embodiment, Ethernet (registered trademark) is employed as the communication interface 21, but beside the Ethernet (registered trademark), it is also possible to use a FDDI (an optical fibre interface), a serial (a type of interface) or a USB (a type of interface).

The first server computer 5 comprises a primary storage device 31, a secondary storage device 33, a central processing device 35, and a communication interface 37. The primary storage device 31 uses RAM and is for reading in a program under the control of the central processing device 35 the same as the primary storage device 17 of the stream forwarding computer 3. An agent processing program 39 and a stream data processing program 41 are loaded into the primary storage device 31.

The agent processing program 39 has functions for monitoring the execution status of a query in the first server computer 5 and processing the registration of a query generated at the time of a scale-out, or deleting a query. More specifically, the agent processing program 39 carries out the collection and analysis of a query structure executed in the stream data processing program 41, and the collection of resource (hardware of the first server computer 5) usage for the respective queries. In addition to the above, the agent processing program 39 also carries out processing for issuing to the stream data processing program 41 a registration command for a migration query (for example, the query that is to be migrated from the first server computer 5 to the second server computer 7), and deleting a query after a condition has been specified, which will described in detail below. The agent processing program 39 comprises a query status table 43, a query collection unit 45, a computer status collection unit 47, a query processing status collection unit 49, and a query migration execution unit 51. The various functions provided in the agent processing program 39 will be described in detail below.

The stream data processing program 41 has functions for the first server computer 5 to execute query processing for stream data 15 inputted from the stream forwarding computer 3 by way of the communication interface 37 and business network 11, and to output the result of this execution. The stream data processing program 41 comprises a data communication unit 53, a query processor 55, a query management table 57, a query management unit 59 and a command receiving unit 61. The query processor 55 comprises an input unit 63, an output unit 65, an operation-targeted data storage unit 67, and an operation execution unit 69. The query management unit 59 comprises a query analysis unit 71, a query optimization unit 73, and a query execution format creation unit 75. The various functions provided by the stream data processing program 41 will be described in detail below.

The secondary storage device 33 is for storing, under the control of the central processing device 35, a program and data comprising a large quantity of information that is unable to be stored in the primary storage device 31, and, for example, uses a HDD (Hard Disk Drive). In this embodiment, the secondary storage device 33 constitutes the storage destination in a case when the query status table 43 included in the agent processing program 39 and the query management table 57 included in the stream data processing program 41 are unable to be stored in the primary storage device 31.

The central processing device 35, for example, comprises a CPU the same as the central processing device 19 of the stream forwarding computer 3, and is for executing a variety of programs that are read into the primary storage device 31. In this embodiment, the central processing device 35, as shown in FIG. 1, executes the agent processing program 39 and the stream data processing program 41 that are read into the primary storage device 31. Further, as needed, the central processing device 35 also executes processing for storing the query status table 43 (included in the agent processing program 39) and the query management table 57 (included in the stream data processing program 41) in the secondary storage device 33.

The communication interface 37 is utilized when the first server computer 5 carries out data communications (information communications) with the stream forwarding computer 3 and the second server computer 7 over the business network 11. The communication interface 37 is also utilized when the first server computer 5 carries out data communications (information communications) with the operation control computer 9 via the management network 13. In data communications with the stream forwarding computer 3, the stream data 15 is sent from the stream forwarding computer 3 to the first server computer 5.

Further, in the data communications with the operation control computer 9, a command 77' is sent from the operation control computer 9 to the first server computer 5. This command 77' comprises a command for registering a migration query in the agent processing program 39, and a command for deleting a query subsequent to a window data match. In data communications with the operation control computer 9, a command completion notification 79' denoting that the first server computer 5 received the above-mentioned command 77' and has completed a series of processes based on this command 77' is sent from the first server computer 5 to the operation control computer 9. The command 77' and the command completion notification 79' will be explained in detail below.

In this embodiment, as the communication interface 37 the Ethernet (registered trademark) is employed similarly to the communication interface 21 in the stream forwarding computer 3, but beside the Ethernet (registered trademark), it is also possible to use a FDDI, a serial, or a USB interface.

The second server computer 7 also comprises a primary storage device, a secondary storage device, a central processing device, and a communication interface the same as the first server computer 5, but descriptions of these have been omitted to simplify the drawing. Furthermore, only two server computers, i.e., the first server computer 5 and the second server computer 7, are described in FIG. 1 for the sake of simplifying the drawing and the explanation, but in an actual stream data processing system it is possible to have case in which three or more server computers are installed.

The operation control computer 9 comprises a primary storage device 81, an input device 83, a central processing device 85, and a communication interface 87. The primary storage device 81, for example, uses RAM and is for reading in a program under the control of the central processing device 85 the same as the primary storage device 17 of the stream forwarding computer 3 and the primary storage device 31 of the first server computer 5 described above. An operation management program 89 is loaded into the primary storage device 81.

The operation management program 89 has a function for executing a process that migrates a portion of a plurality of queries for which processing is being executed by the server computer that is actually in operation (in this embodiment, the first server computer 5) to a server computer that has been newly added (in this embodiment, the second server computer 7) when a scale-out process is carried out. The operation management program 89 comprises a query status table collection unit 91, a server status table 93, a cost computation unit 95, a cost table 97, a migration query decision unit 99, and a command transmission unit 101. The various functions provided by the operation management program 89 will be described in detail below.

The input device 83, for example, comprises an operation key for specifying a migration-source computer, i.e., the one or more server computers on which a plurality of queries are actually being processed, an operation key for specifying a migration-destination computer, i.e., a newly added server computer that will process any of the above-mentioned plurality of queries, and an operation key for inputting a command for commencing a scale-out process to the operation control computer 9. A user (operator) provides migration-source computer specification information, migration-destination computer specification information, and a scale-out process start command to the central processing device 85 via the input device 83 by operating the above-mentioned operation keys.

The communication interface 87 is utilized when the operation control computer 9 carries out data communications (information communications) with the first server computer 5 and with the second server computer 7 over the operation network 13. In data communications with either the first server computer 5 or the second server computer 7, in addition to the command 77' being sent from the operation control computer 9 to either the first server computer 5 or the second server computer 7, the command completion notification 79' corresponding to the above-mentioned command 77' is sent from either the first server computer 5 or the second server computer 7 to the operation control computer 9.

The central processing device 85, for example, also comprises a CPU the same as the central processing device 19 in the stream forwarding computer 3 and the central processing device 35 in the first server computer 5, and is for executing a variety of programs read into the primary storage device 81. In this embodiment, the central processing device 85 executes the operation management program 89 that is read into the primary storage device 81 as shown in FIG. 1.

The communication interface 87 is also utilized when the operation control computer 9 carries out data communications (information communications) with the stream forwarding computer 3 over the operation network 13. In data communications with the stream forwarding computer 3, in addition to the command 77 being sent from the operation control computer 9 to the stream forwarding computer 3, the command completion notification 79 corresponding to the above command 77 is sent from the stream forwarding computer 3 to the operation control computer 9. A detailed description of the commands 77, 77' and the command completion notifications 79, 79' will be omitted here.

Next, the various functions of the stream transmission program 23 loaded into the primary storage device 17 of the stream forwarding computer 3 will be explained in detail.

The stream transmission table 29 is based on the above-mentioned stream ID information, and is utilized when sending the stream data 15 sent to the stream forwarding computer 3 from the stream data source 1 via the business network 11 to the first server computer 5, which will carry out the processing. The stream transmission table 29 comprises a column for recording a stream ID, and a column for recording address information of the transmission-destination server computer (in the example shown in FIG. 1, the first server computer 5 and the second server computer 7) denoting the transmission destination of the stream data. The configuration of the stream transmission table 29 will be described in detail using FIG. 2.

The function of the data transmission unit 25 is to send the stream data, which the stream forwarding computer 3 received from the stream data source 1 via the business network 11, to the first server computer 5 (or the second server computer 7), which is the transmission destination thereof, via the communication interface 21 and the business network 11. That is, first, the stream ID from the stream data 15 received from the stream data source 1 is acquired, and the above-mentioned address information corresponding to this acquired stream ID is selected from the stream transmission table 29 in accordance with referencing the stream transmission table 29. Then, the above-mentioned stream data 15 is sent (transmitted) via the communication interface 21 and the business network 11 to the server computer related to the above-mentioned selected address information (in the example shown in FIG. 1, either one of the first server computer 5 or the second server computer 7).

The function of the transmission destination management unit 27 is to update the data (information) recorded in the stream transmission table 29. That is, the specified stream ID and the address information related to the transmission-destination server computer (in the example shown in FIG. 1, either the first server computer 5 or the second server computer 7) are added to and recorded in the stream transmission table 29 based on a transmission destination add command sent from (a command transmission unit 101 of) the operation management program 89 (loaded into the primary storage device 81 of the operation control computer 9) via the communication interface 87, operation network 13 and communication interface 21. Alternately, in a case where a transmission-destination delete command has been sent from the operation control computer 89 to the stream forwarding computer 3, the specified stream ID and the address information related to the transmission-destination server computer (in the example shown in FIG. 1, either the first server computer 5 or the second server computer 7) are deleted from the stream transmission table 29.

The transmission destination add command and the transmission destination delete command will be explained in detail below.

Next, the various functions of the agent processing program 39 and stream data processing program 41 loaded into the primary storage device 31 of the first server computer 5 will be explained in detail.

In the agent processing program 39, the query status table 43 is needed to produce the migration cost of the query that is actually being executed in the stream data processing program 41 (loaded into the primary storage device 31 together with this agent processing program 39), which is the monitoring target of this agent processing program 39. The query status table 43 comprises a column for recording a query identifier, a column for recording server computer (the first server computer 5) resource usage, a column for recording a query window size, and a column for recording a query throughput (the utilization rate of the CPU, i.e., the central processing device 35).

As used here, the migration cost refers to the throughput required to perform scale-out. Further, the server computer resource refers to device capabilities, such as the central processing device and the secondary storage device of this server computer, and the bandwidth of the input/output interface comprising the Ethernet, serial interface or USB interface that is used. Further, resource usage refers to the resource usage of the first server computer 5 that is running the stream data processing program 41, which is the monitoring target of the agent processing program 39. In this embodiment, the "CPU utilization rate" is used as the resource usage. In addition, the query throughput refers to the amount of data processed by the server computer (either the first server computer 5 or the second server computer 7) executing this query, and the amount of data outputted from this server computer. The configuration of the query status table 43 will be explained in detail using FIG. 5.

The query collection unit 45 collects a query string registered in the above-mentioned stream data processing program 41 (the monitoring target of the agent processing program 39) from the above-mentioned stream data processing program 41. Then, a function of the query collection unit 45 is to select the window size required to compute the migration cost of this query based on this query string. That is, the query collection unit 45 acquires the window size of this query by collecting and analyzing the query ID and query string from the query management table 57 included in the stream data processing program 41. Then, the query collection unit 45 stores the above-mentioned collected query ID in the query identifier recording column of the query status table 43, and stores the window size of this query in the window size recording column of the query status table 43.

The computer status collection unit 47 collects data related to the CPU utilization rate as the data that shows the resource status of the first server computer 5 (running the above-mentioned stream data processing program 41, which is the monitoring target of the agent processing program 39), and stores this collected data in the resource usage recording column, i.e., the CPU utilization rate recording column of the query status table 43.

The function of the computer status collection unit 49 is to acquire data related to the query throughput of the first server computer 5 and to compute the frequency of data input to the first server computer 5 required to compute the migration cost of this query. In this embodiment, the query processing status collection unit 49 collects the number of data streams 15 that were processed in the first server computer 5 based on this query and computes the number of data inputted to the first server computer 5 per unit of time, and, in addition, stores this computer input data number in the query throughput recording column of the query status table 43, that is, in the data input frequency recording column.

The function of the query migration execution unit 51 is to carry out migration processing (from the first server computer 5 to the second server computer 7) of a query generated at the time of a scale-out. That is, the query migration execution unit 51 carries out a process for issuing a query registration command for registering the query to be migrated from the first server computer 5 to the stream data processing program (41) running on the second server computer 7, which is the server computer that has been added. In addition to this, the query migration execution unit 51 also executes a query deletion process subsequent to a window data match, which will be described in detail below, in the first server computer 5, which is the migration-source server computer of this query.

In the stream data processing program 41, the data communication unit 53 has functions for receiving the stream data 15 sent (transmitted) from the stream forwarding computer 3 to the first server computer 5 by way of the communication interface 37 and the business network 11, and outputting this received stream data 15 to the query processor 55.

The function of the query processor 55 is to execute stream data processing in accordance with the registered query. In the query processor 55, the input unit 63 inputs the stream data 15 outputted from the data communication unit 53, and outputs this inputted stream data 15 to the operation execution unit 69. The operation-targeted data storage unit 67 stores the stream data 15, which is outputted from the operation execution unit 69 and which is the target of the operation processing of the operation execution unit 69, and, in addition, outputs the stream data 15 that is being stored in response to a data read request from the operation execution unit 69, to the operation execution unit 69.

The operation execution unit 69, in addition to reading in the above-mentioned stream data 15 provided by the input unit 63, for example, acquires the query that has the stream data 15 read in from the query management table 57 as the processing target by referencing the query management table 57 through the above-mentioned input unit 63. In the stream data process of the operation execution unit 69, the query is executed using the stream data 15 that was inputted (to the first server computer 5) previously in accordance with the sliding window. For this reason, the operation execution unit 69 stores the stream data 15 that is the target of operation processing in the operation-targeted data storage unit 67.

There are queries that specify the range of the processing-targeted stream data 15 with respect to time, and there are queries that specify the range of the processing-targeted stream data 15 with respect to the number of data streams being targeted for processing. Hereinafter, a character string described in accordance with the query language will be referred to as a "query string", a query that specifies the process-targeted stream data 15 range in terms of time will be referred to as a "time-based query", and a query that specifies the range of the process-targeted stream data 15 in terms of the number of data streams being targeted for processing will be referred to as a "number-based query".

In a case where the query to be executed in the operation execution unit 69 is a time-based query, the operation execution unit 69 stores the stream data 15 inputted from the data communication unit 53 via the input unit 63 in the operation-targeted data storage unit 67. In addition to this, of the stream data 15 stored in the operation-targeted data storage unit 67, the stream data 15 for which a storage time has elapsed is deleted from the operation-targeted data storage unit 67.

In a case where the above-mentioned query is a number-based query, the operation execution unit 69 stores the inputted stream data 15 in the operation-targeted data storage unit 67. However, in a case where the number of data streams stored in the operation-targeted data storage unit 67 exceeds a predetermined storage number, for example, the operation execution unit 69 executes processing so as to delete data streams from the operation-targeted data storage unit 67 in order from the stream data 15 that has been stored in the operation-targeted data storage unit 67 for the longest time.

The output unit 65 outputs the result of this query's execution by the operation execution unit 69 to an external machine via the data communication unit 53, for example, via the agent processing program 39 and the communication interface 37.

Furthermore, in the following description, the operation-targeted data storage unit 67 will be referred to as the "window", the data (stream data 15) that is held (stored) in the operation-targeted data storage unit 67 will be referred to as the "window data", and either the storage time or storage number of the stream data 15 in the operation-targeted data storage unit 67 will be referred to as the "window size".

The query management table 57 is utilized for the first server computer 5, for example, to specify a query that has a stream data 15 received from the stream forwarding computer 3 as the processing target, and the query management table 57 comprises a column for recording a query identifier, a column for recording a query string, a column for recording a query execution format storage destination, and a column for recording a query execution target stream ID. As used here, the query identifier refers to a character string used for identifying a registered query, and hereinafter, this character string may also be referred to as a "query ID". Further, the query execution target stream ID is used when acquiring the stream data 15 that this query is targeting for processing.

The query management unit 59 has functions for carrying out the registration and deletion of a query that is executed in the stream data processing program 41, and a function for creating a query execution format (for example, a machine language, a mode of expression that can be read and understood by a machine) from the query string (expressed, for example, using a source code or the like so that the user is able to understand the contents of the query). The method for creating the query execution format from the above-mentioned query string in the query management unit 59 is not particularly limited to the method set forth in this patent application, and an arbitrary method may be used. As an example, the optimization method described in the Japanese Patent Laid-open Publication No. 2006-338432 may also be employed.

In the query management unit 59, the function of the query analysis unit 71 is to analyze the above-mentioned query string. That is, the query analysis unit 71 analyzes the query string provided from the command receiving unit 61 at query registration, and provides the result of this analysis to the query optimization unit 73. The function of the query optimization unit 73 is to receive the query analysis result provided from the query analysis unit 71, and select the most efficient query execution format based on this analysis result (that is, carries out an optimization process). The query execution format creation unit 75 creates the query execution format selected in the query optimization unit 73.

The function of the command receiving unit 61 is to receive a command provided from the agent processing program 39. For example, a query registration command and a query delete command may be cited as the command provided to the command receiving unit 61 from the agent processing program 39. The query registration command is for registering in the query management unit 59 a query for sequentially processing in the first server computer 5 the data (stream data 15) to be inputted to the stream data processing program 41. The query registration command comprises a character string described using the query language. Furthermore, in this embodiment, the CQL (Continuous Query Language) is used as the query language.

Next, the various functions of the operation management program 89 loaded into the primary storage device 81 of the operation control computer 9 will be explained in detail.

In the operation management program 89, the function of the query status table collection unit 91 is to collect the statuses of all the queries (i.e., the contents recorded in the respective query status tables (43)). That is, the query status table collection unit 91 collects the query status table 43, which is under the management of the agent processing program 39 in the respective server computers (in the example shown in FIG. 1, the first server computer 5 and the second server computer 7), and creates the server status table 93. The server status table 93, as described above, is created by the query status table collection unit 91, and is used for managing the statuses of all the queries. The server status table 93 comprises a column for recording a server computer (in the example shown in FIG. 1, the first server computer 5 and the second server computer 7) identifier, a column for recording a query identifier, a column for recording a resource usage for the server computer (for example, the first server computer 5) that is running the stream data processing program 41, a column for recording a window size, and a column for recording a query throughput.

The function of the cost computation unit 95 is to compute for each query the cost required when migrating the respective queries (for example, all the queries for which processing is to be executed in the first server computer 5) to the newly added server computer (in the example shown in FIG. 1, the second server computer 7). That is, the cost computation unit 95 carries out cost computation processing based on the above-mentioned server status table 93, and computes the time, i.e., the estimated migration time, that will probably be required when migrating the respective queries from the server computer actually in operation (in the example shown in FIG. 1, the first server computer 5) to the newly added server computer (in the example shown in FIG. 1, the second server computer 7). Then, the cost computation unit 95 reflects this computer-estimated migration time in the cost table 97. The cost computation process will be explained in detail below. The cost table 97 is used for managing the resource usage of the server computers (the first server computer 5 and the second server computer 7) in accordance with the above-mentioned respective queries, and the cost (i.e., the migration cost) required when migrating these queries from the server computer that is actually in operation (in the example shown in FIG. 1, the first server computer 5) to the newly added server computer (in the example shown in FIG. 1, the second server computer 7).

The function of the migration query decision unit 99 is to decide (select) the query that is to be migrated to the newly added server computer (in the example shown in FIG. 1, the second server computer 7) from among all the queries for which processing is to be executed in the server computer that is actually in operation (in the example shown in FIG. 1, the first server computer 5) at scale-out. That is, the migration query decision unit 99 decides the migration query by executing a migration query selection process based on the information included in the above-mentioned cost table 97. The migration query selection process will be explained in detail below.

The function of the command transmission unit 101 is to send a command for requesting processing to the agent processing program 39 loaded into the primary storage device 31 of the server computers (the first server computer 5 and the second server computer 7) and the stream transmission program 23 loaded into the primary storage device 17 of the stream forwarding computer 3 for executing a scale-out. That is, the command transmission unit 101 respectively sends a transmission destination add command and a transmission destination delete command to the stream transmission program 23, and a command for registering a migration query and a post-window data match query delete command to the agent processing program 39.

Furthermore, the example shown in FIG. 1 illustrates the fact that the stream transmission program 23 is loaded into the primary storage device 17 of the stream forwarding computer 3, the agent processing program 39 and the stream data processing program 41 are loaded into the primary storage device 31 of the first server computer 5, and the operation management program 89 is loaded into the primary storage device 81 of the operation control computer 9, respectively. However, the above-mentioned programs 23, 39, 41 and 89 may also be loaded in the primary storage device of a single computer. Further, in the example shown in FIG. 1, it is assumed that a plurality of server computers (like the first server computer 5 and the second server computer 7) installed with the agent processing program 39 and the stream data processing program 41 are provided to handle the execution of query processing. However, the execution of query processing for a plurality of processes may be handled by a single computer provided as the server computer installed with the agent processing program 39 and the stream data processing program 41.

In addition, in the example shown in FIG. 1, the stream data source 1 and the stream forwarding computer 3, as well as the stream forwarding computer 3 and the first server computer 5 and the second server computer 7 are connected via the business network 11. Further, the operation control computer 9, the stream forwarding computer 3, the first server computer 5 and the second server computer 7 are connected via the operation network 13. However, the above-mentioned machines may be connected using only one of either the business network 11 or the operation network 13.

FIG. 2 is a diagram showing an example of the configuration of the stream transmission table 29 included in the stream transmission program 23 disclosed in FIG. 1.

The above-mentioned stream transmission table 29, as shown in FIG. 2, comprises a column for recording a stream ID 111 and a column for recording a transmission destination IP address 113. Information related to a stream ID is stored in the stream ID recording column 111. The IP address of the first server computer 5, which is installed with the stream data processing program 41, is stored in the transmission destination IP address recording column 113. In the example shown in FIG. 2, "S1, S2, S3" are recorded in the stream ID recording column 111 as stream IDs. Further, "192.168.0.2" is recorded in the transmission destination IP address recording column 113 as the IP address. The respective stream data having the above-mentioned respective stream IDs are transmitted from the stream forwarding computer 3 to the server computer having the above-mentioned IP address, i.e., the first server computer 5.

FIG. 3 is a diagram showing examples of query descriptions in the Stanford University Data Stream Management System.

In the examples of query descriptions shown in FIG. 3, the character string 115, which is an example of a time-based query, denotes a query for computing the average data value, which is the value of the stream data 15 of stream ID "S1" that was inputted 30 seconds ago. Further, the character string 117, which is an example of a number-based query, denotes a query for computing the average data value, which is the value of five steam data 15 of stream ID "S1" inputted previously. The character strings 115 and 117 described in FIG. 3 are both examples of character strings described using the CQL.

FIG. 4 is a diagram showing an example of the configuration of the query management table 57 included in the stream data processing program 41 disclosed in FIG. 1.

The above-mentioned query management table 57, as shown in FIG. 4, comprises a column for recording a query ID 119, a column for recording a query string 121, a column for recording a query execution format storage destination 123, and a column for recording an execution target stream ID 125. For example, "Q1, Q2 and Q3", which are the IDs of registered queries, are stored in the query ID recording column 119. The query string corresponding to the query ID "Q1" is stored in the query string recording column 121 that is in the same row as this query ID "Q1", and the address of the primary storage device 31, in which is stored the above-mentioned query execution format, is stored in the query execution format storage destination recording column 123 that is in the same row as the query ID "Q1" as the query execution format corresponding to this query ID "Q1". In addition, "S1" is stored in the execution target stream ID recording column 125 that is in the same row as the query ID "Q1" as the ID (identifier) of the query execution target stream corresponding to this query ID "Q1".

Further, the query string corresponding to the query ID "Q2" is stored in the query string recording column 121 that is in the same row as this query ID "Q2", and the address of the primary storage device 31, in which is stored the above-mentioned query execution format, is stored in the query execution format storage destination recording column 123 that is in the same row as the query ID "Q2" as the query execution format corresponding to this query ID "Q2". In addition, "S2" is stored in the execution target stream ID recording column 125 that is in the same row as the query ID "Q2" as the ID (identifier) of the query execution target stream corresponding to this query ID "Q2".

In addition, the query string corresponding to the query ID "Q3" is stored in the query string recording column 121 that is in the same row as this query ID "Q3", and the address of the primary storage device 31, in which is stored the above-mentioned query execution format, is stored in the query execution format storage destination recording column 123 that is in the same row as the query ID "Q3" as the query execution format corresponding to this query ID "Q3". In addition, "S3" is stored in the execution target stream ID recording column 125 that is in the same row as the query ID "Q3" as the ID (identifier) of the query execution target stream corresponding to this query ID "Q3".

FIG. 5 is a diagram showing an example of the configuration of the query status table 43 included in the agent processing program 39 disclosed in FIG. 1.

The above-mentioned query status table 43, as shown in FIG. 5, comprises a column for recording a query ID 127, a column for recording a CPU utilization rate (%) 129, a column for recording a window size 131, and a column for recording a data input frequency (number/seconds) 133. "Q1, Q2 and Q3", which are the individual query identifiers, i.e., the query IDs, are stored in the query ID recording column 127. The CPU utilization rate (%) of the first server computer 5 running the monitoring-target stream data processing program 41, i.e., the CPU utilization rate (%) "50" corresponding to the query ID "Q1", is stored in the CPU utilization rate (%) recording column 129 that is in the same row as this query ID "Q1". "1 minute" is stored in the window size recording column 131 that is in the same row as the query ID "Q1" as the window size 131 corresponding to this query ID "Q1". Furthermore, "10" is stored in the data input frequency (number/seconds) recording column 133 that is in the same row as the query ID "Q1" as the query throughput, i.e., data input frequency (number/seconds) corresponding to this query ID "Q1". As used here, the data input frequency denotes the number of stream data 15 targeted for query processing that have been inputted to the first server computer 5 per unit of time. The respective information stored in the respective columns related to the query ID "Q1" denotes the fact that a query having a query ID is using 50% of the CPU of the first server computer 5, that the window size is one minute, and that 10 pieces of stream data are being inputted into the first server computer 5 per second.

Further, the CPU utilization rate (%) "30" corresponding to the query ID "Q2", is stored in the CPU utilization rate (%) recording column 129 that is in the same row as this query ID "Q2", and "10 seconds" is stored in the window size recording column 131 that is in the same row as the query ID "Q2" as the window size 131 corresponding to this query ID "Q2". Furthermore, "100" is stored in the data input frequency (number/seconds) recording column 133 that is in the same row as the query ID "Q2" as the data input frequency (number/seconds) corresponding to this query ID "Q2".

Furthermore, the CPU utilization rate (%) "20" corresponding to the query ID "Q3", is stored in the CPU utilization rate (%) recording column 129 that is in the same row as this query ID "Q3", and "100" is stored in the window size recording column 131 that is in the same row as the query ID "Q3" as the window size 131 corresponding to this query ID "Q3". Furthermore, "50" is stored in the data input frequency (number/seconds) recording column 133 that is in the same row as the query ID "Q3" as the data input frequency (number/seconds) corresponding to this query ID "Q3".

FIG. 6 is a diagram showing an example of the configuration of the server status table 93 included in the operation management program 89 disclosed in FIG. 1.

The above-mentioned server status table 93 is created based on a query status table 43 that the query status table collection unit 91 (of the operation management program 89) collected from the agent processing program 39, and, as shown in FIG. 6, comprises a column for recording a server ID 135, a column for recording a query ID 137, a column for recording a CPU utilization rate (%) 139, a column for recording a window size 141, and a column for recording a data input frequency (number/second) 143.

An identifier (i.e., an ID) ("A" in the example shown in FIG. 6), which is uniquely allocated to each of the respective server computers (in the example shown in FIG. 1, the first server computer 5 and the second server computer 7) is stored in the server ID recording column 135 as the identifier of a server computer (in the example shown in FIG. 1, the first server computer 5 and the second server computer 7). Furthermore, the information stored in the query ID recording column 137 is the same as the information stored in the query ID recording column 127 shown in FIG. 5, the information stored in the CPU utilization rate (%) recording column 139 is the same as the information stored in the CPU utilization rate (%) recording column 129 shown in FIG. 5, and the information stored in the window size recording column 141 is the same as the information stored in the window size recording column 131 shown in FIG. 5. As such, duplicate explanations will be omitted here.

FIG. 7 is a diagram showing an example of the configuration of the cost table 97 included in the operation management program 89 disclosed in FIG. 1.

The above-mentioned cost table 97, as shown in FIG. 7, comprises a column for recording a server ID 145, a column for recording a query ID 147, a column for recording a CPU utilization rate (%) 149, and a column for recording a migration time (estimate) 151. The information stored in the server ID recording column 145 is the same as the information stored in the server ID recording column 135 shown in FIG. 6, the information stored in the query ID recording column 147 is the same as the information stored in the query ID recording column 137 shown in FIG. 6, and the information stored in the CPU utilization rate (%) recording column 149 is the same as the information stored in the CPU utilization rate (%) recording column 139 shown in FIG. 6. As such, duplicate explanations will be omitted here. The migration time (estimate) from the server computer that is actually in operation (in the example shown in FIG. 1, the first server computer 5) to the newly added server computer (in the example shown in FIG. 1, the second server computer 7) of a query computed using the cost computation unit 95 based on the server status table 93 is stored in the migration time (estimate) recording column 151 as the query migration cost. In the examples shown in FIG. 7, the above-mentioned migration time (estimate) of the query having the query ID "Q1" is "60 seconds", the above-mentioned migration time (estimate) of the query having the query ID "Q2" is "10 seconds", and the above-mentioned migration time (estimate) of the query having the query ID "Q3" is "2 seconds".

In the system configuration disclosed in FIG. 1 above, the stream forwarding computer 3 is already operating using the stream transmission table 29 shown in FIG. 2, the first server computer 5 is already operating using the query management table 57 shown in FIG. 4 and the query status table 43 shown in FIG. 5, and the operation control computer 9 is already operating using the server status table 93 shown in FIG. 6 and the cost table 97 shown in FIG. 7. The operational steps of the scale-out process in a case where the second server computer 7 is newly added as the server computer for executing query processing in this state will be explained below.

First, the status of the stream data processing system prior to the scale-out being carried out will be explained.

The first server computer 5, which is actually in operation, has the IP address 192.168.0.2, and the second server computer 7 has the IP address 192.168.0.3. The stream transmission program 23 maintains the stream transmission table 29 shown in FIG. 2, and, on the basis of the stream ID included in the stream data 15 received from the stream data source 1, transmits this stream data 15 to the corresponding server computer, i.e., the first server computer 5. As is clear from the preceding, it is assumed that stream data 15 having the three types of stream IDs (S1, S2, S3) in the stream transmission table 29 shown in FIG. 2 will be transmitted.

In the first server computer 5, the stream data processing program 41 is executing processing related to three queries (Q1, Q2, Q3), and comprises the query management table 57 shown in FIG. 4. Further, the agent processing program 39 is monitoring the status (operating status) of the stream data processing program 41, and comprises the query status table 43 shown in FIG. 5.

Next, the steps of scale-out processing when the second server computer 7 is added as a new server computer in the stream data processing system in which only the first server computer 5 is operating to execute processing related to a query will be explained below.

First, the user (operator) respectively specifies one or more server computers (in the example shown in FIG. 1, the first server computer 5) as the query migration source and one or more server computers (in the example shown in FIG. 1, the second server computer 7) as the query migration destination by operating the input device 83 of the operation control computer 9, and also inputs the command for starting scale-out processing. In this embodiment, when the user (operator) inputs the scale-out processing start command to the operation control computer 9 via the input device 83 as described above, the first server computer 5 is specified as the migration-source computer, and the second server computer 7 is specified as the migration-destination computer, respectively. However, it is also possible to set the above-mentioned stream data processing system so that the migration-source server computer and the migration-destination server computer are detected automatically and scale-out processing is started without the user inputting the scale-out processing start command.

Hereinafter, the agent processing program 39 and the stream data processing program 41 that are running on the first server computer 5, which is the migration-source server computer, will respectively be referred to as the "migration-source agent processing program 39" and the "migration-source stream data processing program 41". Further, the agent processing program 39 and the stream data processing program 41 that are running on the second server computer 7, which is the migration-destination server computer, will respectively be referred to as the "migration-destination agent processing program 39" and the "migration-destination stream data processing program 41".

Next, a scale-out in a case where the second server computer 7 is added as a new server computer in the stream data processing system in which only the first server computer 5 is operating to execute the processing related to a query will be explained below.

The scale-out process is executed using a flow of processing that collects information related to all the queries, computes the cost from the collected information, and, based on this computer cost, selects either one or a plurality of queries so that the query migration time from the migration-source server computer to the migration-destination server computer is short, and, in addition, the server computer loads are uniform, and then migrates the selected query from the migration-source server computer to the migration-destination server computer. When the above-mentioned selected query is migrated from the migration-source server computer to the migration-destination server computer, instead of the already described copy method, a query migration process that uses a warm-up method, which will be described in detail below, is carried out in order to prevent delays from occurring in the migration process.

Next, the specific steps of the above-mentioned scale-out process will be explained.

Figure 8:
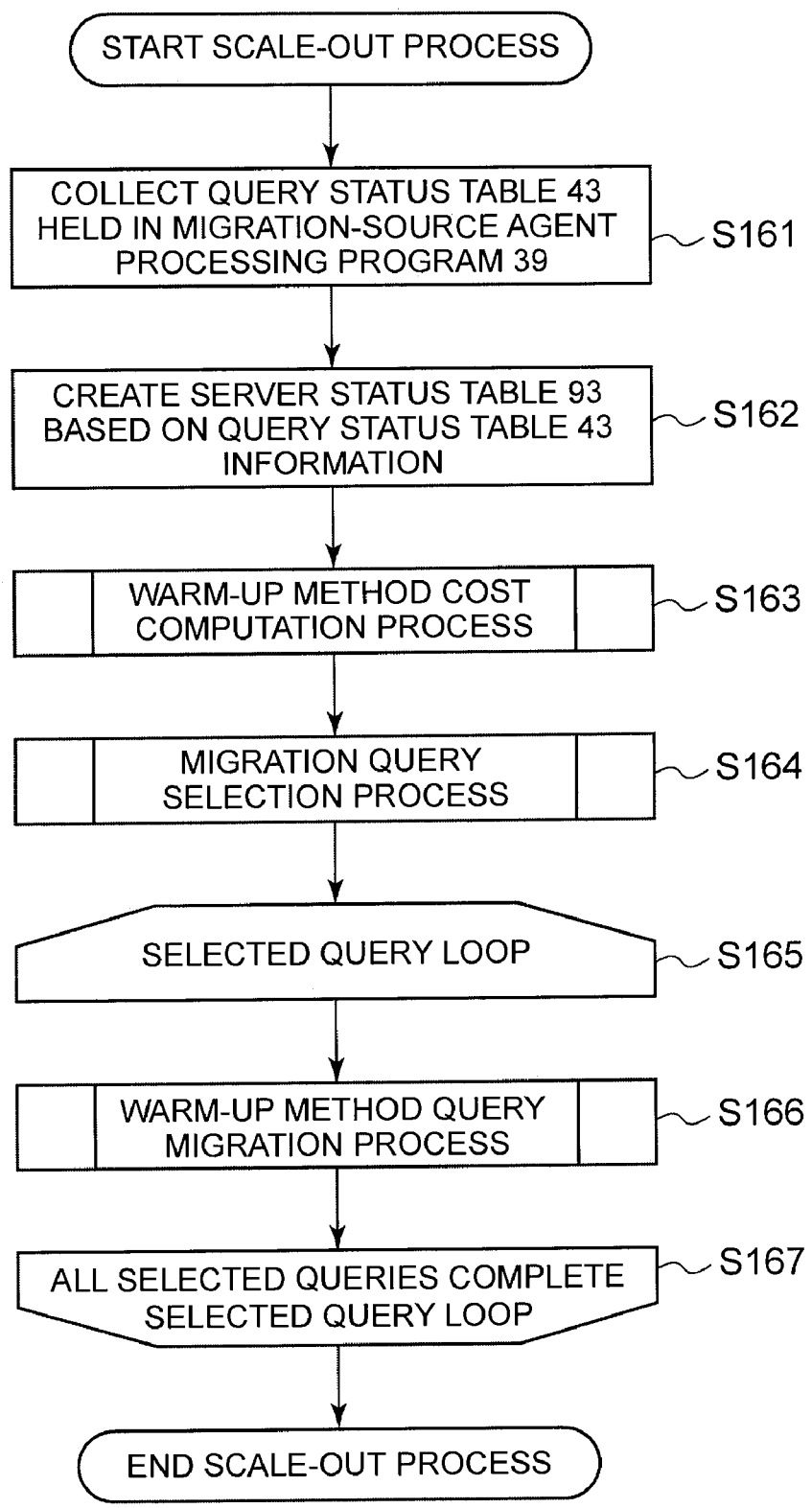
FIG. 8 is a flowchart showing an example of the steps of a scale-out process related to the first embodiment of the present invention.

FIG. 8 is a flowchart showing an example of the steps of scale-out processing related to the first embodiment of the present invention.

In FIG. 8, first, the operation management program 89 collects the query status table 43 included in the migration-source agent processing program 39. In this embodiment, since the first server computer 5 is specified as the migration-source server computer, the query status table included in the agent processing program 39 that is monitoring the stream data processing program 41 running on the first server computer 5 is collected (Step S161). Next, the server status table 93 is created from the information in the collected query status table 43. In this embodiment, the "A", which is the identifier (ID) of the first server computer 5, is stored in the server ID recording column 135 (shown in FIG. 6) of the server status table 93 with respect to the collected query status table 43 (Step S162).

When the creation of the server status table 93 via the above-described processing operation is complete, the cost computation process, which will be explained in detail below, is executed (Step S163). When this cost computation process is complete, the query selection process, which will be described in detail below, is executed. The details of the query selection process will be explained below, but the queries related to the query IDs "Q2" and "Q3" are respectively selected as the migration queries in accordance with this query selection process (Step S164). When the above-mentioned query selection process is complete, lastly, the query migration process is executed using the warm-up method described below. That is, query migration processing using the warm-up method is executed for all of the queries selected in the above-mentioned query selection process. In this embodiment, query Q2 and query Q3, which were selected in accordance with the query selection process, are migrated from the first server computer 5 to the second server computer 7 (Steps S165, S166, S167).

In accordance with the above, a scale-out process is completed in the stream data processing system related to the first embodiment of the present invention, a processing operation related to the query Q1 is executed in the migration-source stream data processing program 41, and processing operations related to the query Q2 and the query Q3 are respectively executed in the migration-destination stream data processing program 41.

Figure 9:
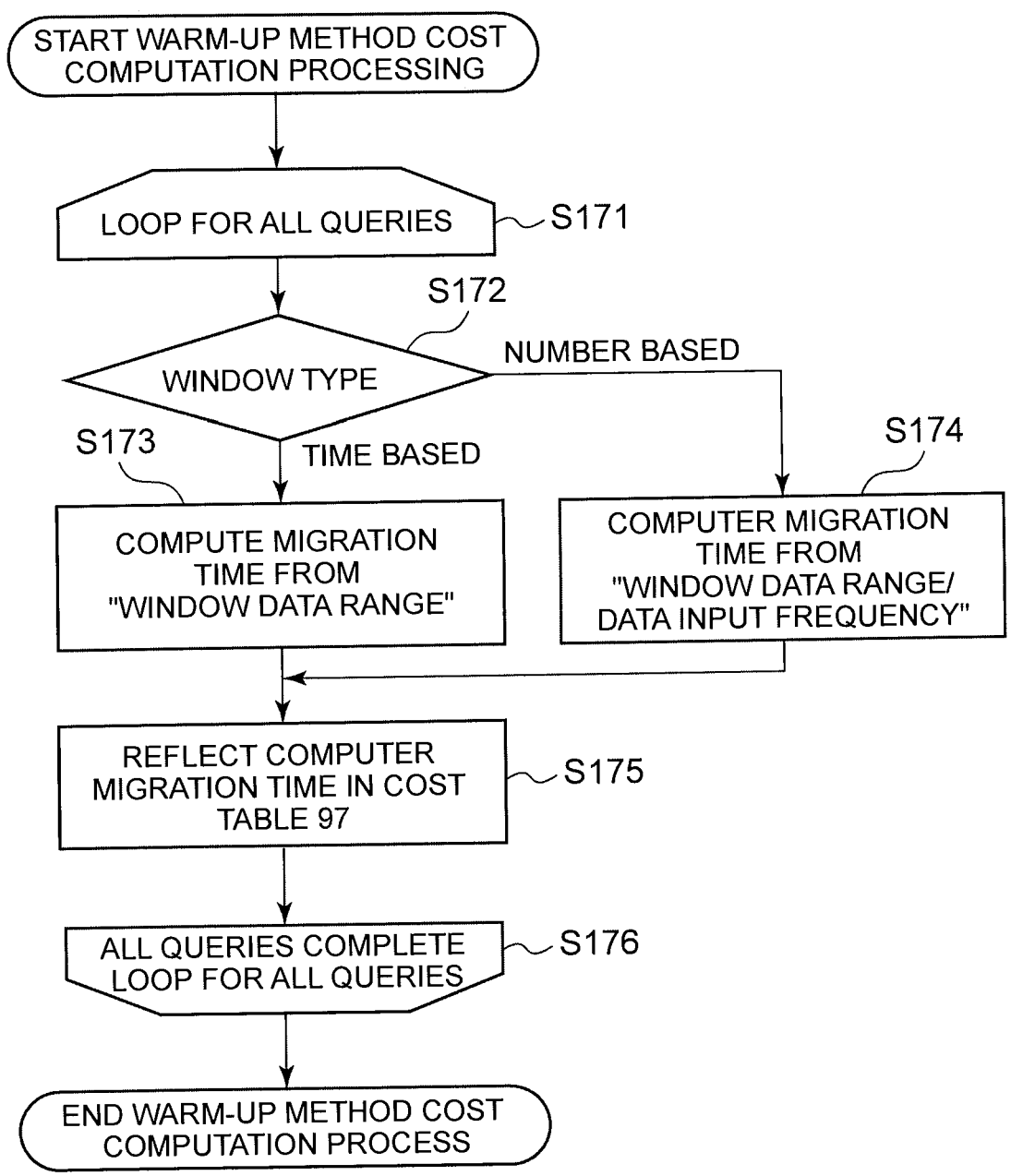
FIG. 9 is a flowchart showing an example of the processing steps in a cost computation process of a warm-up method.

FIG. 9 is a flowchart showing an example of the processing steps in the cost computation process of the warm-up method.

The warm-up method cost computation process executed in Step S163 of FIG. 8 is for computing the cost required for the migration of each individual query when using the warm-up method to migrate the migration-targeted query from the migration-source server computer to the migration-destination server computer. In the flowchart shown in FIG. 9, the migration time (estimate) required to migrate the query (from the migration-source server computer to the migration-destination server computer) is used as the migration cost at the time of a scale-out.

In FIG. 9, the cost computation process is executed for all the queries stored in the server status table 93 (Step S171). That is, first, a determination is made as to whether the query window is time based or number based by checking the type of the window of the targeted query (Step S172). In a case where it is determined that the result of the above check is time based, the process for computing the migration time of this query is executed based on the "window data range" of this query (Step S175), and next, the process for reflecting (recording) the migration time computed in Step S173 in the migration time (estimate) recording column 151 (shown in FIG. 7) of the cost table 97 is executed (Step S175).

Alternately, in a case where it is determined that the result of the above check is number based, the process for computing the migration time of this query is executed based on the "window data range/data input frequency" of this query (Step S174), and next, the process for reflecting (recording) the migration time computed in Step S174 in the migration time (estimate) recording column 151 of the cost table 97 is executed (Step S175). Then, when it is confirmed that the processing operations respectively shown in Step S172 through Step S175 have been executed for all the queries (Step S176), the series of processing operations shown in FIG. 9 ends. In accordance with the above processing ending, as already explained using FIG. 7, the migration time of the query Q1 is estimated to be 60 seconds, the migration time of the query Q2 is estimated to be 10 seconds, and the migration time of the query Q3 is estimated to be 2 seconds.

Figure 10:
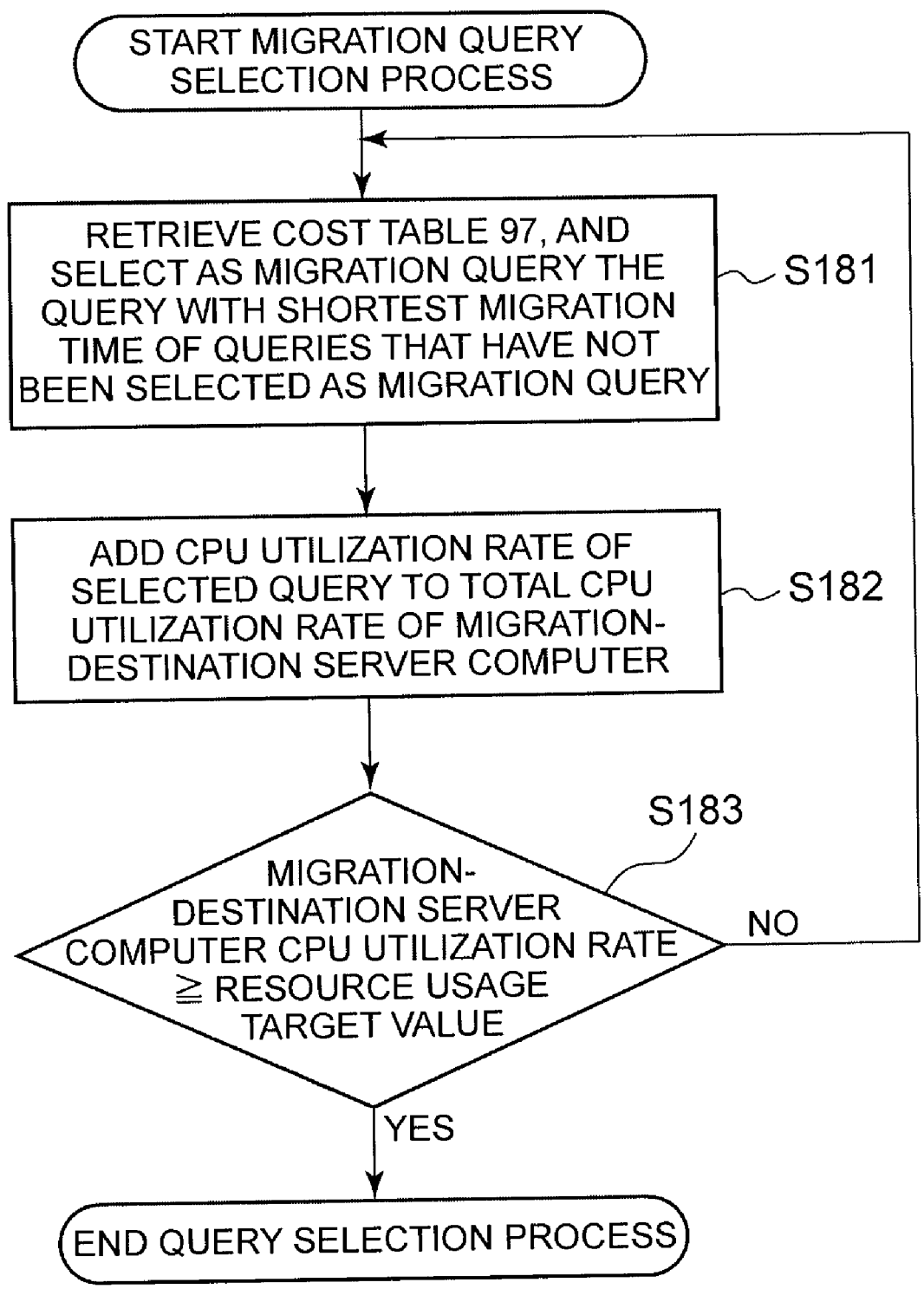
FIG. 10 is a flowchart showing an example of the processing steps in a migration query selection process related to the first embodiment of the present invention.

FIG. 10 is a flowchart showing an example of the processing steps in the migration query selection process related to the first embodiment of the present invention.

The migration query selection process executed in Step S164 of FIG. 8 is for selecting the query for which it is possible to carry out a migration from the migration-source server computer (in the example shown in FIG. 1, the first server computer 5) to the migration-destination server computer (in the example shown in FIG. 1, the second server computer 7) in a short period of time, and, in addition, which will contribute to the reduction of the resource usage in the migration-source server computer in accordance with being migrated.

In FIG. 10, first, the cost table 97 is retrieved, and the query having the shortest migration time (estimate) is selected as the migration query from among the queries that have actually not been selected as migration queries (Step S181). Next, a process for adding the CPU utilization rate of the query selected as the migration query in Step S181 to the total CPU utilization rate of the migration-destination server computer (the second server computer 7) is executed. In this embodiment, the migration-destination server computer (in the example shown in FIG. 1, the second server computer 7) has a total CPU utilization rate of "0%" in the initial state (signifying that the migration-destination server computer is not being used in stream data processing), and it is in this state that the CPU utilization rate of the query to be migrated is added (Step S182).

The processing operations respectively shown in Steps S181 and S182 are continued until it is determined that the relationship between the CPU utilization rate in the migration-destination server computer and a certain threshold value called the target resource usage value is CPU utilization rate≧the target resource usage value (Step S183: YES).

In this embodiment, the processing operations of the migration query selection process shown in FIG. 10 are commenced with a target resource usage value of 50% Selecting the query Q2, which is the query having the shortest migration time, as the migration query results in the total CPU utilization rate of the first server computer 5, which is the migration-source server computer, being 80% and the total CPU utilization rate of the second server computer 7, which is the migration-destination server computer, being 20% Since the total CPU utilization rate (20%) of the second server computer 7, which is the migration-destination server computer, does not exceed 50% which is the target resource usage value, once again the query having the shortest migration time (estimate) is selected as the migration query from among the queries that have actually not been selected as migration queries. That is, the query Q3, which has the next shortest migration time after the query Q2, is selected as the migration query. As a result of this, the total CPU utilization rate of the first server computer 5 and the total CPU utilization rate of the second server computer 7 together add up to 50% Since the total CPU utilization rate of the second server computer 7 has reached 50% which is the target resource usage value, the processing operations of the migration query selection process shown in FIG. 10 come to an end. As a result of the above-mentioned processing operations, the query Q2 and the query Q3 are selected as the queries to be migrated from the first server computer 5 to the second server computer 7.

Figure 11:
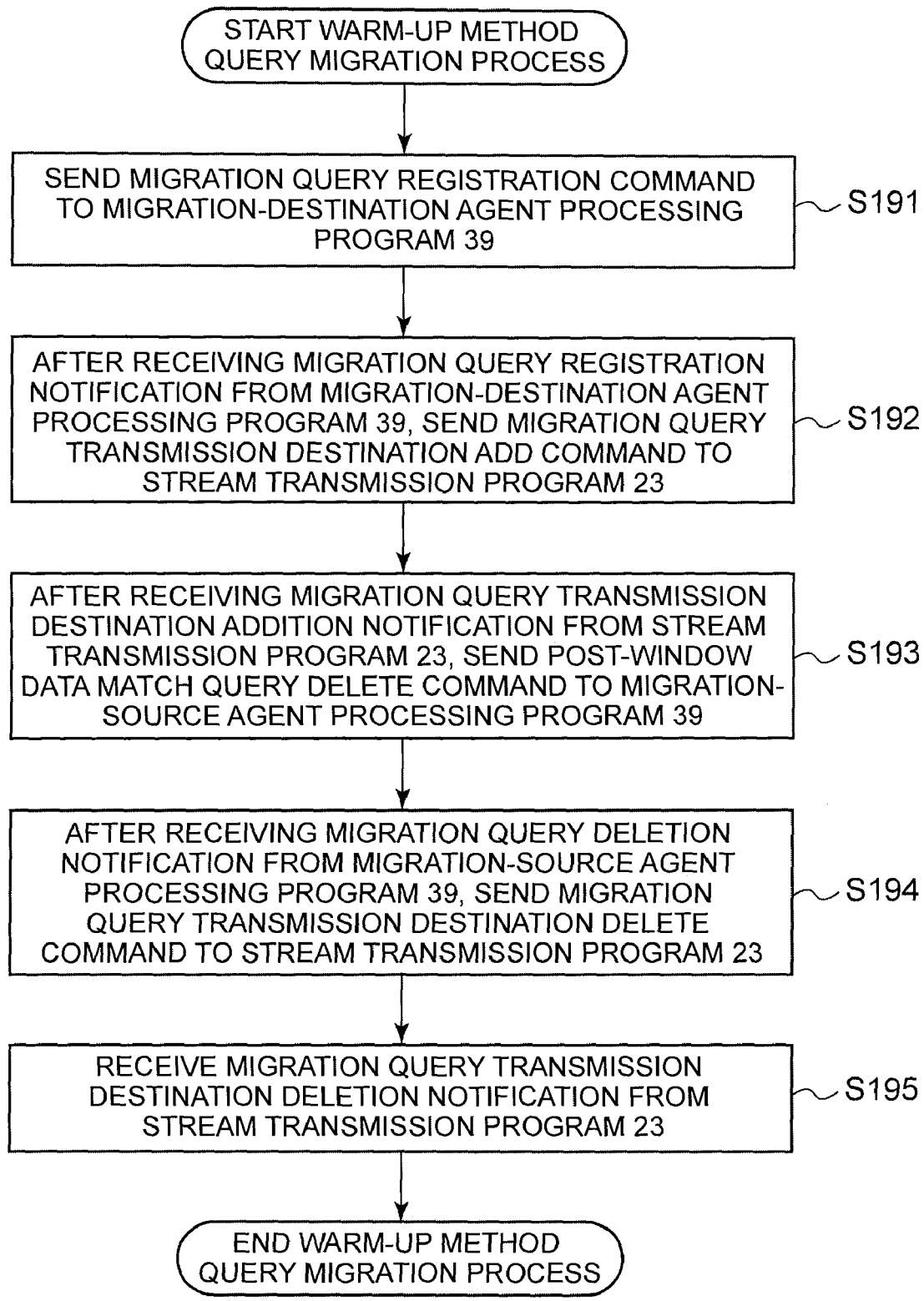
FIG. 11 is a flowchart showing an example of the processing steps in a migration query selection process in accordance with a warm-up method related to the first embodiment of the present invention.

FIG. 11 is a flowchart showing an example of the processing steps of the migration query selection process in accordance with the warm-up method related to the first embodiment of the present invention.

The warm-up method-based migration query selection process executed in Step S166 of FIG. 8 is a process for migrating a query by respectively sending the same stream data of a certain period to both of a pre-migration query and a post-migration query, which are the same migration query, matching the pre-migration window data in this query to the post-migration window data in this query, and thereafter suspending the processing operations related to the pre-migration query. This approach differs from the above-mentioned copy method-based query migration process in that the window data is not copied, thereby making it possible to migrate a targeted query without delaying the processing related to the query.

In FIG. 11, first, the operation management program 89 sends the command (hereinafter, this command may also be referred to as the "stream migration query registration command") 77 to the migration-destination agent processing program 39 to the effect that the migration query is to be registered in the migration-destination stream data processing program 41 (Step S191). Upon receiving the above-mentioned stream migration query registration command 77, the migration-destination agent processing program 39 executes the processing operation for registering the query to be migrated in the migration-destination stream data processing program 41. When this processing operation ends, the migration-destination agent processing program 39 sends to the operation management program 89 the command completion notification (hereinafter, this completion notification may also be referred to as the "migration query registration notification") 79 denoting that the registration of the query to be migrated in the migration-destination stream data processing program 41 has ended. Upon receiving the above-mentioned migration query registration notification 79, the operation management program 89 sends to the stream transmission program 23 a command (hereinafter, this command may also be referred to as the "migration query transmission destination add command") to the effect that the IP address of the newly added server computer (the second server computer 7) is to be added to (the server computer, which is) the transmission destination of the stream data 15, which is the processing target of the query to be migrated (Step S192).

Upon receiving the above-mentioned migration query transmission destination add command, the stream transmission program 23 adds and records the stream data, i.e., the stream ID, which is the processing target of the query to be migrated, in the stream ID recording column 111 of the stream transmission table 29. Further, the stream transmission program 23 also adds and records the IP address of the newly added server computer (the second server computer 7) in the transmission-destination IP address recording column 113 of the above-mentioned stream transmission table 29. Then, when the above-mentioned processing ends, the stream transmission program 23 notifies the operation management program 89 to the effect that this above-mentioned processing has ended. Furthermore, the notification to the effect that the adding and recording of the above-mentioned stream ID in the stream ID recording column 111 of the stream transmission table 29, and the adding and recording of the above-mentioned IP address in the transmission-destination IP address recording column 113 of the stream transmission table 29 have been completed may also be referred to as the "migration query transmission destination add notification" hereinafter. As is clear from the preceding, in this embodiment, the queries to be migrated are the queries Q2 and Q3, and the stream transmission table 29 is updated such that the stream data 15 denoted by the stream ID "S2", which is the processing target of the query Q2, and the stream data 15 denoted by the stream ID "S3", which is the processing target of the query Q3, are transmitted from the stream forwarding computer 3 to the second server computer 7, which is the newly added server computer. Upon receiving the above-mentioned migration query transmission destination add notification, the operation management program 89 sends the command 77' to the migration-source agent processing program 39 for starting the post-window data match query deletion process, which will be explained in detail below. Hereinafter, the command for starting the above-mentioned post-window data match query deletion process may also be referred to as the "post-window data match query delete command" (Step S193).

Upon receiving the above-mentioned command 77', the migration-source agent processing program 39 carries out the post-window data match query deletion process in accordance with this delete command 77', and when this delete process is complete, sends the command completion notification 79' showing that this delete process has been completed to the operation management program 89. Hereinafter, the command completion notification showing that the above-mentioned post-window data match query delete has been completed may also be referred to as the "migration query deletion notification". Upon receiving the above-mentioned migration query deletion notification 79', the operation management program 89 sends to the stream transmission program 23 a command to the effect that the IP address of the migration-source server computer (the first server computer 5) is to be deleted from the IP address of the server computers (the first server computer 5 and the second server computer 7), which are the transmission destinations of the stream data 15 that is the processing target of the migration query. Hereinafter, the command to the effect that the IP address of the migration-source server computer is to be deleted from the IP address of the server computers, which are the transmission destinations of the stream data 15 that is the processing target of the migration query, may also be referred to as the "migration query transmission destination delete command" (Step S194).

Next, the stream transmission program 23 notifies the operation management program 89 to the effect that the processing for preventing the transmission to the server computer that is the migration source of the above-mentioned stream data 15 has been completed while preventing the stream data 15 having the stream ID that shows this stream data 15 is the processing target of the migration query from being transmitted to the migration-source server computer (i.e., the first server computer 5). Hereinafter, the notification to the effect that the processing for preventing the transmission to the migration-source server computer of the stream data 15 having the stream ID that shows this stream data 15 is the processing target of the migration query may also be referred to as the "migration query transmission destination deletion notification". In this embodiment, the stream ID "S2" of the stream data 15 that is the processing target of the query Q2 and the stream ID "S3" of the stream data 15 that is the processing target of the query Q3, as well as the IP address "192.168.0.2" related to the first server computer 5, which is the transmission destination of these stream data 15, and which is running the stream data processing program 41, are deleted. When the above-described transmission destination delete process is complete, the stream transmission program 23 sends a transmission destination delete completion notification to the operation management program 89, and the operation management program 89 receives this transmission destination delete completion notification (Step S195). The series of processing operations related to the warm-up method based migration query selection process ends in accordance with the above.

Figure 12:
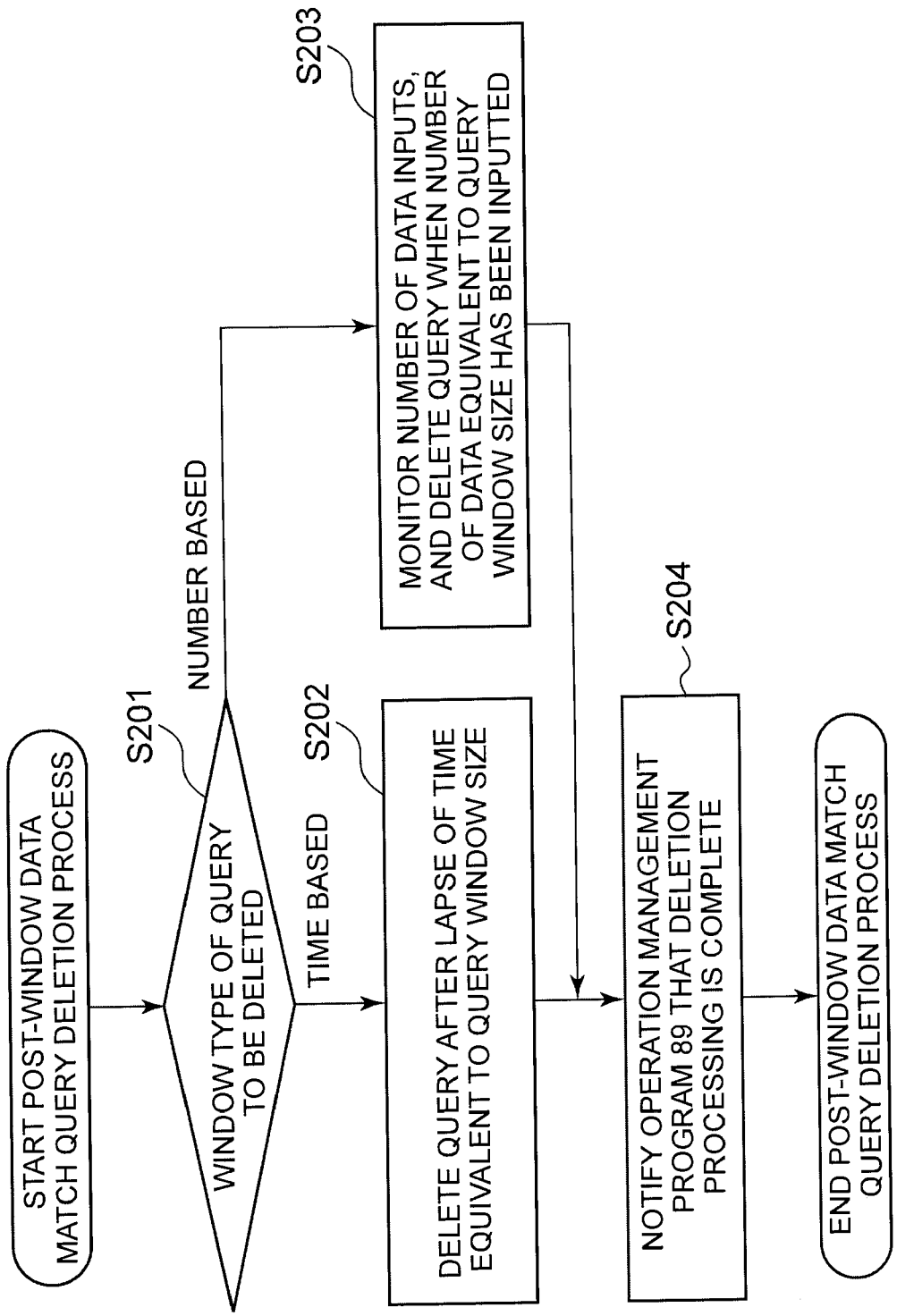
FIG. 12 is a flowchart showing an example of the processing operations of a post-window data match query deletion process related to the first embodiment of the present invention.

FIG. 12 is a flowchart showing an example of the processing operations of the post-window data match query deletion process related to the first embodiment of the present invention.

The post-window data match query deletion process executed in Step S193 of FIG. 11 is the process, which the migration-source agent processing program 39 executes based on the post-window data match query delete command received from the operation management program 89, and which deletes this query subsequent to the pre-migration window data matching up with the post-migration window data in this query to be migrated.

In FIG. 12, the migration-source agent processing program 39 first checks the type of the window to determine if the window in the request to be deleted is a time-based window or a number-based window. This is because the condition for window data matching will differ in accordance with whether the window of the query to be deleted is a time-based window or a number-based window (Step S201).

When it is determined that the result of the check in Step S201 is that the window of the query to be deleted is a time-based window, the migration-source agent processing program 39 executes this query deletion process when the window size time of this query has elapsed. This is because, in a case where this query window is a time-based window, the window data of prior to the migration of this query and the window data of subsequent to the migration of this query will match following the passage of a time equivalent to the window size of this query (Step S202). When the processing operation denoted in Step S202 is complete, the transmission-source agent processing program 39 notifies the operation management program 89 to the effect that this query has been deleted (Step S204), and the series of processing operations shown in FIG. 12 ends.

Alternately, when it is determined that the result of the check in Step S201 is that the window of the query to be deleted is a number-based window, the migration-source agent processing program 39 monitors the number of inputs of data (stream data 15) (to the first server computer 5), and executes this query deletion process at the point in time when this number of data inputs reaches the data range number of the window size of this query. This is because, in a case where this query window is a number-based window, the window data of prior to this query migration and the window data of subsequent to this query migration will match when stream data 15 of the data range of this query window is inputted (Step S203). When the processing operation shown in Step S203 is complete, the migration-source agent processing program 39 notifies the operation management program 89 to the effect that the above-mentioned query has been deleted (Step S204), and the series of processing operations shown in FIG. 12 ends.

Next, the steps of a scale-out in a case where there is a plurality of server computers (in the example shown in FIG. 1, the first server computer 5 and the second server computer 7) that are the target of the scale-out in the stream data processing system will be explained.

FIG. 13 is a diagram showing the contents of a stream transmission table included in the stream transmission program in a case where there is a plurality of server computers that are the targets of scale-out in the stream data processing system related to the first embodiment of the present invention.

In FIG. 13, a stream transmission table 211 comprises a column 213 for recording a stream ID and a column 215 for recording an IP address of the transmission-destination stream data processing program (41) the same as the stream transmission table 29 shown in FIG. 2. The stream ID recording column 213 records "S1, S2, S3, S4, S5" as the information related to the stream ID. Further, the transmission-destination stream data processing program (41) IP address recording column 215 records "192.168.0.2 and 192.168.0.3" as the IP addresses. As is clear from the contents of the stream transmission table 211 shown in FIG. 13, stream data 15 having the stream ID "S1", stream data 15 having the stream ID "S2", and stream data 15 having the stream ID "S3" are transmitted to the first server computer that has the IP address "192.168.0.2", and stream data 15 having the stream ID "S4", and stream data 15 having the stream ID "S5" are transmitted to the second server computer 7 that has the IP address "192.168.0.3".

FIG. 14 is a diagram showing the contents of a query status table included in the agent processing program 39 of a server computer (the second server computer 7) that has been newly added to an existing server computer (the first server computer 5) for realizing a scale-out process in the stream data processing system related to the first embodiment of the present invention.

In FIG. 14, a query status table 217 comprises a column for recording a query ID 219, a column for recording a CPU utilization rate (%) 221, a column for recording a window data range 223, and a column for recording a data input frequency (number/seconds) 225 the same as the query status table 43 shown in FIG. 5. "Q4 and Q5", which are the IDs of individual queries, are stored in the query ID recording column 219. The CPU utilization rate (%) of the second server computer 7, which will run the monitoring targeted stream data processing program 41, that is, the CPU utilization rate (%) "45" corresponding to the query ID "Q4", is stored as the resource usage in the CPU utilization rate (%) recording column 221 that is in the same row as this query ID "Q4". "300" is stored as the window data range corresponding to the query ID "Q4" in the window data range recording column 223 that is in the same row as this query ID "Q4". Furthermore, "1" is stored as the query throughput, that is, as the data input frequency (number/seconds) corresponding to the query ID "Q4" in the data input frequency (number/seconds) recording column 225 that is in the same row as this query ID "Q4". Since the data input frequency has already been explained in detail, this explanation will be omitted here.

Further, the CPU utilization rate (%) "40" corresponding to the query ID "Q5" is stored in the CPU utilization rate (%) recording column 221 that is in the same row as this query ID "Q5", and "5 seconds" is stored as the window data range corresponding to the query ID "Q5" in the window data range recording column 223 that is in the same row as this query ID "Q5". Furthermore, "25" is stored as the data input frequency (number/seconds) corresponding to the query ID "Q5" in the data input frequency (number/seconds) recording column 225 that is in the same row as this query ID "Q5".

The first server computer 5 executes the processing related to each of the three queries Q1, Q2, and Q3 based on the query status table (given as reference numeral 43 in FIG. 5) included in the agent processing program 39 thereof, and the second server computer 7 executes the processing related to each of the two queries Q4 and Q5 based on the query status table (given as reference numeral 217 in FIG. 14) included in the agent processing program 39 thereof.

FIG. 15 is a diagram showing an example of the configuration of a server status table of the operation control computer 9 in a case where there is a plurality of server computers that are targeted for the scale-out process in the stream data processing system related to the first embodiment of the present invention. FIG. 15 is a diagram showing an example of the configuration of a server status table included in the operation management program 89 in a case where there is a plurality of stream data processing programs, i.e., migration-source stream data processing programs (41) targeted for scale-out processing.

In FIG. 15, a server status table 227 comprises a column for recording a server ID 229, a column for recording a query ID 231, a column for recording a CPU utilization rate (%) 233, a column for recording a window data range 235, and a column for recording a data input frequency (number/second) 237 substantially the same as the server status table 93 shown in FIG. 6.

A server ID "A" of the first server computer 5 and a server ID "B" of the second server computer 7 are respectively stored as the server computer identifiers in the server ID recording column 229. "Q1", "Q2" and "Q3" are respectively stored as the identifiers of individual queries (i.e., the query IDs) in the query ID recording column 231 corresponding to the server ID recording column 229 in which the server ID "A" is stored. "50" is stored as the CPU utilization rate in the CPU utilization rate (%) recording column 233 corresponding to the query ID recording column 231 in which the query ID "Q1" is stored. Further, "1 minute" is stored as the window data range in the window data range recording column 235 corresponding to the query ID recording column 231 in which the query ID "Q1" is stored. Furthermore, "10" is stored as the input frequency range of the stream data 15 in the data input frequency (number/seconds) recording column 237 corresponding to the query ID recording column 231 in which the query ID "Q1" is stored.

Next, "30" is stored as the CPU utilization rate in the CPU utilization rate (%) recording column 233 corresponding to the query ID recording column 231 in which the query ID "Q2" is stored. Further, "10 seconds" is stored as the window data range in the window data range recording column 235 corresponding to the query ID recording column 231 in which the query ID "Q2" is stored. Furthermore, "100" is stored as the input frequency range of the stream data 15 in the data input frequency (number/seconds) recording column 237 corresponding to the query ID recording column 231 in which the query ID "Q2" is stored. Next, "20" is stored as the CPU utilization rate in the CPU utilization rate (%) recording column 233 corresponding to the query ID recording column 231 in which the query ID "Q3" is stored. Further, "100" is stored as the window data range in the window data range recording column 235 corresponding to the query ID recording column 231 in which the query ID "Q3" is stored. Furthermore, "50" is stored as the input frequency range of the stream data 15 in the data input frequency (number/seconds) recording column 237 corresponding to the query ID recording column 231 in which the query ID "Q3" is stored.

Alternately, "Q4" and "Q5" are respectively stored as the query IDs in the query ID recording column 231 corresponding to the server ID recording column 229 in which the server ID "B" is stored. "45" is stored as the CPU utilization rate in the CPU utilization rate (%) recording column 233 corresponding to the query ID recording column 231 in which the query ID "Q4" is stored. Further, "300" is stored as the window data range in the window data range recording column 235 corresponding to the query ID recording column 231 in which the query ID "Q4" is stored. Furthermore, "1" is stored as the input frequency range of the stream data 15 in the data input frequency (number/seconds) recording column 237 corresponding to the query ID recording column 231 in which the query ID "Q4" is stored. Next, "40" is stored as the CPU utilization rate in the CPU utilization rate (%) recording column 233 corresponding to the query ID recording column 231 in which the query ID "Q5" is stored. Further, "5 seconds" is stored as the window data range in the window data range recording column 235 corresponding to the query ID recording column 231 in which the query ID "Q5" is stored. Furthermore, "25" is stored as the input frequency range of the stream data 15 in the data input frequency (number/seconds) recording column 237 corresponding to the query ID recording column 231 in which the query ID "Q5" is stored.

Furthermore, the information that is respectively stored in the CPU utilization rate (%) recording column 233, the window data range recording column 235 and the data input frequency (number/seconds) recording column 237 related to the "Q1", the "Q2" and the "Q3" in the query ID recording column 231 is the same as that shown in FIG. 5. Further, the information that is respectively stored in the CPU utilization rate (%) recording column 233, the window data range recording column 235 and the data input frequency (number/seconds) recording column 237 related to the "Q4" and the "Q5" in the query ID recording column 231 is the same as that shown in FIG. 14. Accordingly, a duplicate explanation of the above-mentioned information will be omitted here.

FIG. 16 is a diagram showing an example of the configuration of a cost table of operation control computer 9 in a case where there is a plurality of server computers, i.e., a plurality of migration-source server computers targeted for scale-out processing in the stream data processing system related to the first embodiment of the present invention. In other words, FIG. 16 is a diagram showing an example of the configuration of a cost table included in the operation management program 89 in a case where there is a plurality of stream data processing programs, i.e., a plurality of migration-source stream data processing programs (41) targeted for scale-out processing.

In FIG. 16, a cost table 239 comprises a column for recording a server ID 241, a column for recording a query ID 243, a column for recording a CPU utilization rate (%) 245, and a column for recording a migration time (estimate) 247 substantially the same as the cost table 97 shown in FIG. 7.

A server ID "A" of the first server computer 5 and a server ID "B" of the second server computer 7 are respectively stored as the server computer identifiers in the server ID recording column 241. "Q1", "Q2" and "Q3" are respectively stored as the identifiers of individual queries (i.e., the query IDs) in the query ID recording column 243 corresponding to the server ID recording column 241 in which the server ID "A" is stored. "50" is stored as the CPU utilization rate in the CPU utilization rate (%) recording column 245 corresponding to the query ID recording column 243 in which the query ID "Q1" is stored. Further, a time (estimate) of "60 seconds" for the migration of the query from the migration-source server computer to the migration-destination server computer is stored as the query migration cost in the migration time (estimate) recording column 247 corresponding to the query ID recording column 243 in which the query ID "Q1" is stored. Next, "30" is stored as the CPU utilization rate in the CPU utilization rate (%) recording column 245 corresponding to the query ID recording column 243 in which the query ID "Q2" is stored. Further, a time (estimate) of "10 seconds" for the migration of the query from the migration-source server computer to the migration-destination server computer is stored as the query migration cost in the migration time (estimate) recording column 247 corresponding to the query ID recording column 243 in which the query ID "Q2" is stored. Next, "20" is stored as the CPU utilization rate in the CPU utilization rate (%) recording column 245 corresponding to the query ID recording column 243 in which the query ID "Q3" is stored. Further, a time (estimate) of "2 seconds" for the migration of the query from the migration-source server computer to the migration-destination server computer is stored as the query migration cost in the migration time (estimate) recording column 247 corresponding to the query ID recording column 243 in which the query ID "Q3" is stored.

Alternately, "Q4" and "Q5" are respectively stored as the individual query IDs in the query ID recording column 243 corresponding to the server ID recording column 241 in which the server ID "B" is stored. "45" is stored as the CPU utilization rate in the CPU utilization rate (%) recording column 245 corresponding to the query ID recording column 243 in which the query ID "Q4" is stored. Further, a time (estimate) of "300 seconds" for the migration of the query from the migration-source server computer to the migration-destination server computer is stored as the query migration cost in the migration time (estimate) recording column 247 corresponding to the query ID recording column 243 in which the query ID "Q4" is stored. Next, "40" is stored as the CPU utilization rate in the CPU utilization rate (%) recording column 245 corresponding to the query ID recording column 243 in which the query ID "Q5" is stored. Further, a time (estimate) of "5 seconds" for the migration of the query from the migration-source server computer to the migration-destination server computer is stored as the query migration cost in the migration time (estimate) recording column 247 corresponding to the query ID recording column 243 in which the query ID "Q5" is stored.

The following explanation is premised on a case in which, in the above-mentioned stream data processing system, the stream transmission table 211 shown in FIG. 13 is used as the stream transmission table, the query status table 217 shown in FIG. 14 is used as the query status table, the server status table 227 shown in FIG. 15 is used as the server status table, and the cost table 239 shown in FIG. 16 is used as the cost table.

In a case where it is assumed that the user has specified the first server computer 5 and the second server computer 7 as the migration-source server computers by way of the input device 83 of the operation control computer 9 at the start of a scale-out process in the above-mentioned stream data processing system, the user specifies a newly added third server computer (the disclosure of which has been omitted in FIG. 1 for the sake of simplifying the drawing and the explanation) as the migration-destination server computer. In other words, when the user specifies the stream data processing program 41 of the first server computer 5 and the stream data processing program 41 of the second server computer 7 as the migration-source stream data processing programs (41) at the time the above-mentioned scale-out process is to start, the user, for example, will specify the stream data processing program of the third server computer (not shown in the drawing) having the IP address "192.168.0.4" as the migration-destination stream data processing program (41). Furthermore, the processing steps of the scale-out explained below differ from the processing steps of the scale-out explained using FIGS. 8 through 12 in that processing is carried out for selecting the stream data processing program (41), which is actually executing the processing related to the query selected as the query to be migrated, prior to selecting the query to be migrated based on the computer cost.

Figure 17:
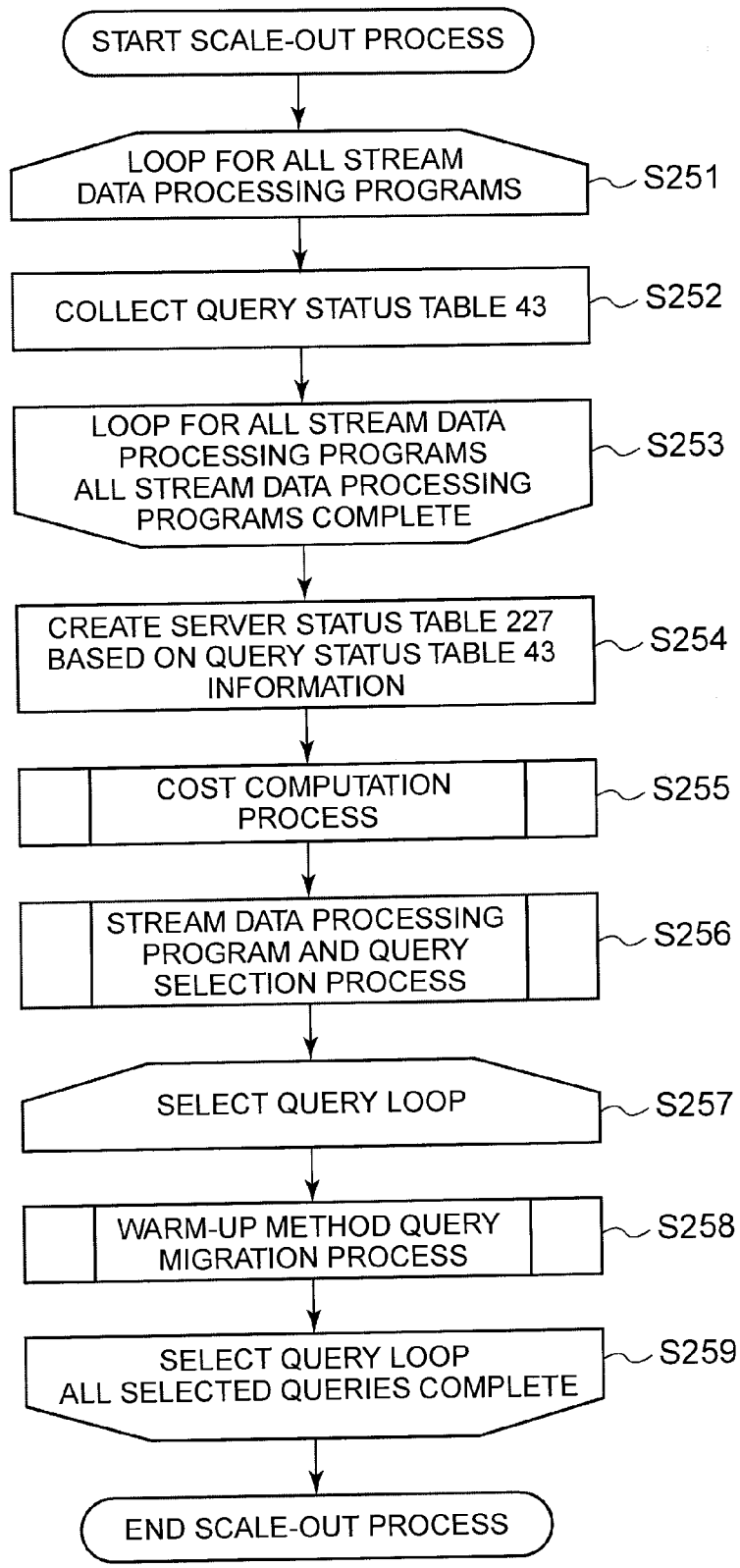
FIG. 17 is a flowchart showing an example of the processing steps of a scale-out in a case where there is a plurality of stream data processing programs, i.e., migration-source stream data processing programs targeted for scale-out processing in the stream data processing system related to the first embodiment of the present invention.

FIG. 17 is a flowchart showing an example of the processing steps of a scale-out in a case where there is a plurality of stream data processing programs, i.e., migration-source stream data processing programs (41) that are targeted for scale-out processing in the stream data processing system related to the first embodiment of the present invention.

In FIG. 17, first, the operation management program 89 collects information related to all the queries for which processing is being executed in all of the migration-source stream data processing programs (41) (Step S251). That is, in order to make the stream data processing program 41 in the first server computer 5 and the stream data processing program 41 in the second server computer 7, which are the migration-source stream data processing programs, the targets of the scale-out, the operation management program 89 respectively collects the query status table 43 (shown in FIG. 5) from the agent processing program 39 in the first server computer 5 and the query status table 217 (shown in FIG. 14) from the agent processing program 39 in the second server computer 7 (Step S252).

When it has been confirmed that the process denoted in Step S252 has been executed for all the migration-source agent processing programs 39 (Step S253), the operation management program 89 creates a server status table based on all of the query status tables (43, 217) collected in the Step S252. The server status table at this time constitutes a configuration like that denoted using reference numeral 227 in FIG. 15 (Step S254). Upon creating the above-mentioned server status table 227, the operation management program 89 executes the processing for computing the cost, i.e., the migration cost, required at the migration of the above-mentioned queries (Step S255).

When the migration cost computation processing of Step S255 has ended, the operation management program 89 executes the process for selecting the stream data processing program (41) and the process for selecting the query. This stream data processing program (41) selection process and query selection process will be explained in detail below (Step S256).

When the selection processes of Step S256 have ended, the operation management program 89 starts the above-described warm-up method-based query migration process for all of the queries that were selected (Steps S257, S258). Then, when it has been confirmed that the above-mentioned warm-up method query migration process has been executed for all of the selected queries (Step S259), the series of processing operations related to the scale-out shown in FIG. 17 ends. Furthermore, the processing steps (flowcharts) shown in FIG. 11 and FIG. 12 are applied in the query selection processing of Step S256.

The scale-out process in a case where there is a plurality of migration-source server computers is completed in accordance with the above.

Figure 18:
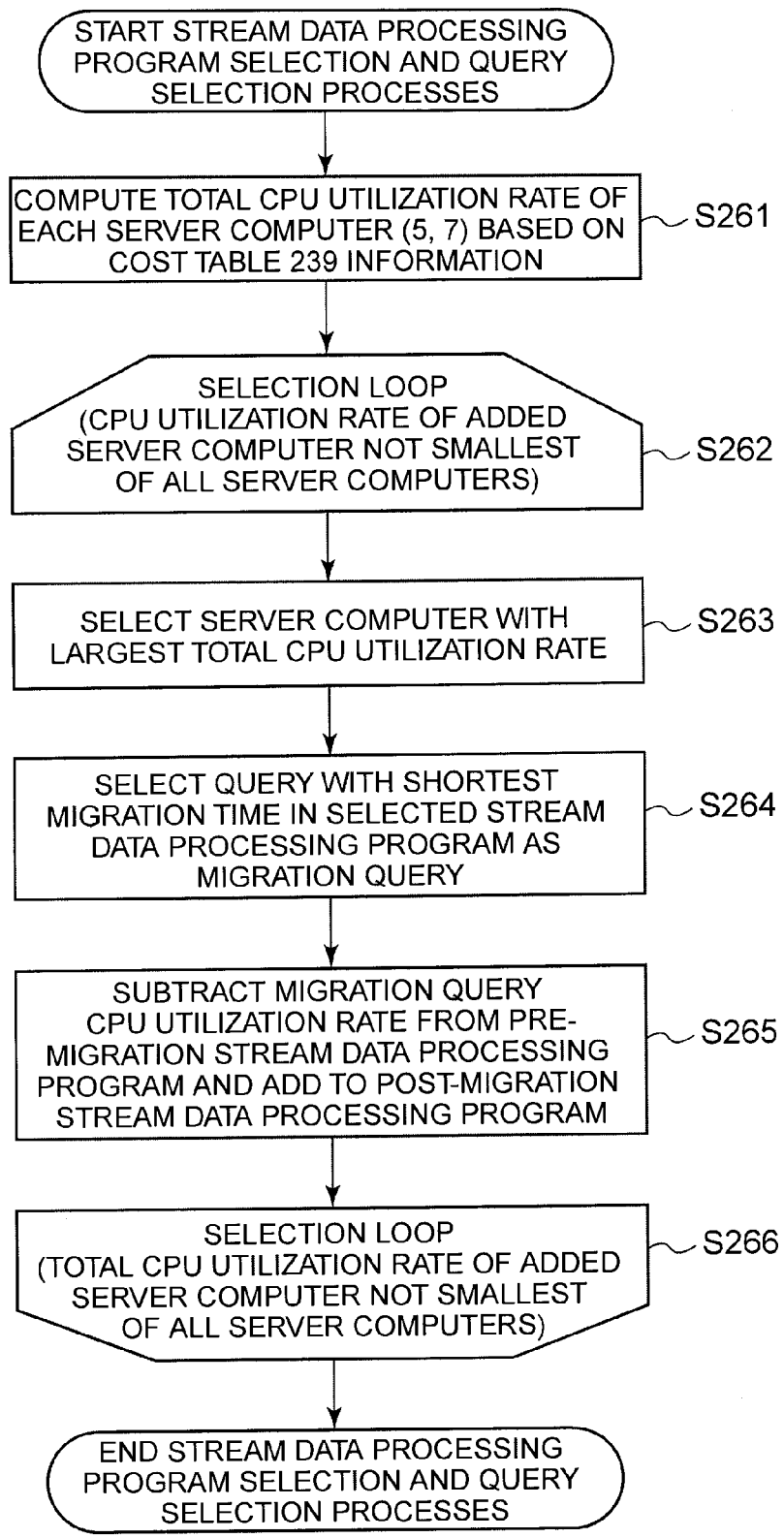
FIG. 18 is a flowchart showing an example of the stream data processing program in the processing steps for the scale-out in FIG. 17 and the processing steps for query selection processing.

FIG. 18 is a flowchart showing an example of the processing steps of the stream data processing program and query selection processes in the scale-out processing steps shown in FIG. 17.

The stream data processing program and query selection processes executed in Step S256 of FIG. 17 are processes via which the operation management program 89 selects the migration-source stream data processing program (41) in which processing operations related to the query to be migrated (from the migration-source server computer to the migration-destination server computer) are actually being executed, and selects the query to be migrated from within this selected stream data processing program (41).

In FIG. 18, the operation management program 89 first computes the total CPU utilization rate (%) of the server computers (the first server computer 5 and the second server computer 7) regarded as the migration sources based on the cost table 239 shown in FIG. 16. In this embodiment, the CPU utilization rate (%) in the first server computer 5 is "100%", and the CPU utilization rate (%) in the second server computer 7 is "85%", as shown in FIG. 16. Then, the CPU utilization rate (%) in the server computer newly added when the processing operations shown in FIG. 18 commenced (that is, the third server computer, a drawing of which has been omitted here) is "0%" (Step S261).

Next, a process is commenced in which the processing for selecting the query to be migrated from the migration-source server computer to the migration-destination server computer and migrating this query to the migration-destination server computer is repeated until the CPU utilization rate in the migration-destination server computer is no longer the smallest (Step S262). That is, first, the operation management program 89 retrieves the server computer having the largest total CPU utilization rate (%) of all the server computers. This server computer is the server computer in which the resources are most strained, and, as is clear from the preceding explanation, in this embodiment is the first server computer 5 (Step S263). Next, the query having the shortest migration time of the plurality of queries to be processed in the stream data processing program (41) of this retrieved server computer is selected as the migration query from this retrieved server computer. In this embodiment, the query Q3, which has the shortest migration time of the queries being processed in the first server computer 5, is selected as the migration query (Step S264).

When the selection processing for the above-mentioned migration query Q3 has ended, the operation management program 89 executes processing for subtracting the CPU utilization rate (%) related to the above-mentioned migration query Q3 from the total CPU utilization rate (%) in the first server computer 5, and for adding this subtracted CPU utilization rate (%) to the total CPU utilization rate (%) of the (not shown in the drawing) third server computer, which is the newly added server computer. As a result of executing this processing, in this embodiment, the CPU utilization rate (%) in the first server computer 5 becomes "80%", the CPU utilization rate (%) in the second server computer 7 remains at "85%", and the CPU utilization rate (%) in the (not shown) third server computer becomes "20%" (Step S265). At the point in time when the processing denoted by Step S265 has ended, the CPU utilization rate (%) in the (not shown) third server computer, which is the newly added server computer, is the smallest at "20%". For this reason, the processing operations respectively denoted by Step S263 through Step S265 are repeated (Step S266).

In repeating the processing operations respectively denoted by Step S263 through Step S265, the query Q5, which has the shortest migration time of the queries being processed in the second server computer 7 as the migration queries, is selected as the migration query. As a result of this, the CPU utilization rate (%) in the first server computer 5 remains unchanged at "80%", the CPU utilization rate (%) in the second server computer 7 becomes "45%", and the CPU utilization rate (%) in the (not shown) third server computer becomes "65%", and as such the CPU utilization rate (%) in the (not shown) third server computer comes to exceed the CPU utilization rate (%) in the second server computer 7. For this reason, the series of processing operations shown in FIG. 18 ends.

The explanations provided using FIG. 1 through FIG. 18 limited the query migration method to the warm-up method. However, as is clear from the preceding explanations, a migration method called the copy method also exists in addition to the warm-up method as a query migration method. When employing the copy method as the query migration method, a delay occurs in the processing of the query itself, but, depending on the query, it is possible to significantly shorten the migration time by using the copy method instead of the warm-up method to execute a query migration process. For this reason, it is possible to assume that there will also be cases in which a query migration will be carried out in accordance with the copy method via which the migration time will be short even when a delay occurs in the processing of the query itself.

Accordingly, a query migration technique that selects the migration method for each individual query, and also selects the query having the shortest migration time for the selected migration method will prove effective.

Figure 19:
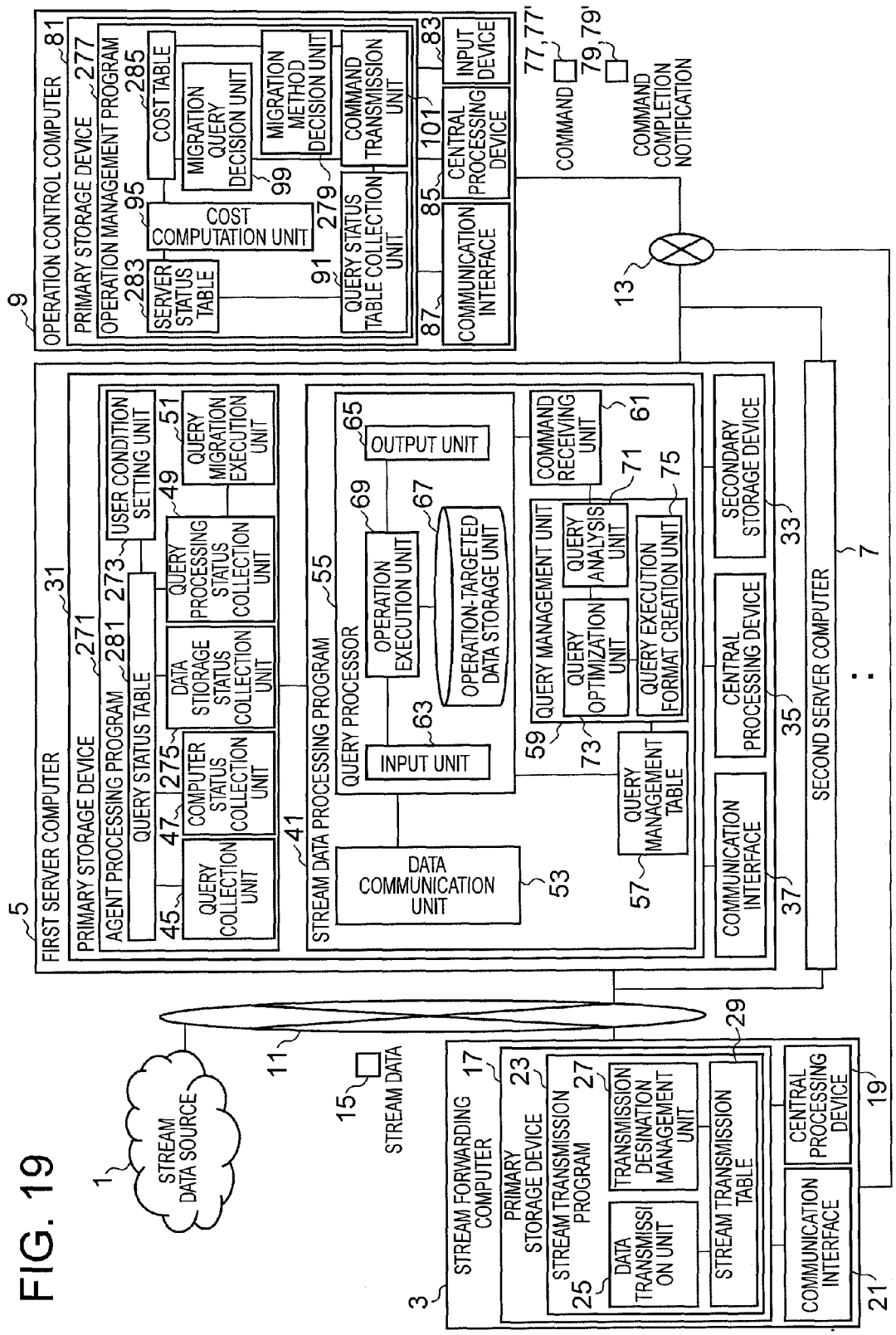
FIG. 19 is a functional block diagram showing the overall configuration of a stream data processing system related to another embodiment of the present invention.

FIG. 19 is a functional block diagram showing the overall configuration of a stream data processing system related to another embodiment of the present invention.

As is clear from comparing FIG. 19 against FIG. 1, the stream data processing system related to the other embodiment of the present invention differs from the configuration of the stream data processing system related to the first embodiment of the present invention shown in FIG. 1 in that a processing function denoted by the user condition setting unit 273, and a processing function denoted by the data storage status collection unit 275 have been newly added to an agent processing program 271 loaded in the primary storage device 31 of the server computers (the first server computer 5 and the second server computer 7).

In addition to the above, the stream data processing system related to the other embodiment of the present invention also differs from the configuration of the stream data processing system related to the first embodiment of the present invention shown in FIG. 1 in that a processing function denoted by the migration unit decision unit 279 has been newly added to an operation management program 277 loaded in the primary storage device 81 of the operation control computer 9.

Furthermore, other than the above points, since the configuration of the stream data processing system in FIG. 19 is the same as the configuration of the stream data processing system shown in FIG. 1, the same reference numerals will be assigned to elements in FIG. 19 that are the same as those shown in FIG. 1, and detailed explanations of these same elements will be omitted.

In FIG. 19, the data storage status collection unit 275 has a processing function for monitoring the window status, that is, for monitoring the data quantity of the operation-targeted data being stored in the window in this embodiment. The user condition setting unit 273 has a function for making it possible for the user to carry out the various settings related to the scale-out process. In this embodiment, the user condition setting unit 273 is used when the user sets an allowable time for each query as the delay time that occurs in the processing of the query itself in accordance with a scale-out process that uses the copy method. Hereinafter, the time that the user is able to allow for a delay in the delay that occurs in the processing of the query itself may also be referred to as the "allowable delay time". The migration method decision unit 279 has a function for deciding the migration method of the query. In this embodiment, processing for selecting the query migration method that is suitable for each query is carried out by referencing the cost table 285 shown in FIG. 22.

FIG. 20 is a diagram showing an example of the configuration of a query status table 281 included in the agent processing program 271 disclosed in FIG. 19.

In FIG. 20, the query status table 281 is substantially the same as the query status table 43 shown in FIG. 5, and in addition to comprising a column for recording the query ID 287, a column for recording the CPU utilization rate (%) 289, a column for recording the window data range 295, and a column for recording the data input frequency (number/seconds) 297, also comprises a column for recording the in-window data (MB) 291, a column for recording the operation network bandwidth (MB/second) 293, and a column for recording the allowable delay time (seconds) 299. The contents of the query ID recording column 287 are the same as those of the query ID recording column 127 of FIG. 5, the contents of the CPU utilization rate (%) recording column 289 are the same as those of the CPU utilization rate (%) recording column 129 of FIG. 5, the contents of the window data range recording column 295 are the same as those of the window data range recording column 131 of FIG. 5, and the contents of the data input frequency (number/second) recording column 297 are the same as those of the data input frequency (number/second) recording column 133 of FIG. 5, and as such, duplicate explanations of these columns and their contents will be omitted here.

The quantity of data (stream data) stored inside the window of each query is stored in MB units in the in-window data (MB) recording column 291. "20" is stored as the in-window data (MB) in the in-window data (MB) recording column 291 that is in the same row as the query ID "Q1", and "10" is stored as the in-window data (MB) in the in-window data (MB) recording column 291 that is in the same row as the query ID "Q2". Furthermore, "30" is stored as the in-window data (MB) in the in-window data (MB) recording column 291 that is in the same row as the query ID "Q2".

The operation network bandwidth (MB/second), which is stored in the operation network bandwidth (MB/second) recording column 293, constitutes an index of the processing capability for copying window data between the migration-source server computer and the migration-destination server computer, and refers to the data transmission rate per unit of time in the network (i.e., the operation network) that connects the migration-source server computer and the migration-destination server computer. In this embodiment, "2.5" is stored as the operation network bandwidth (MB/second) in the operation network bandwidth (MB/second) recording column 293. An allowable delay time (seconds) is stored as the user settable index (information) related to the scale-out process in the allowable delay time (seconds) recording column 299. In this embodiment, "1" is stored as the allowable delay time (seconds) in the allowable delay time (seconds) recording column 299 that is in the same row as the query ID "Q1", "10" is stored as the allowable delay time (seconds) in the allowable delay time (seconds) recording column 299 that is in the same row as the query ID "Q2", and "5" is stored as the allowable delay time (seconds) in the allowable delay time (seconds) recording column 299 that is in the same row as the query ID "Q3".

FIG. 21 is a diagram showing an example of the configuration of a server status table 283 included in the operation management program 277 disclosed in FIG. 19.

In FIG. 21, the server status table 283 is substantially the same as the server status table 93 shown in FIG. 6, but in addition to comprising a column for recording a server ID 301, a column for recording a query ID 303, a column for recording a CPU utilization rate (%) 305, a column for recording a window data range 311, and a column for recording a data input frequency (number/second) 313, also comprises a column for recording the in-window data (MB) 307, a column for recording the operation network bandwidth (MB/second) 309, and a column for recording the allowable delay time (seconds) 315. The contents of the server ID recording column 301 are the same as those of the server ID recording column 135 of FIG. 6, the contents of the query ID recording column 303 are the same as those of the query ID recording column 137 of FIG. 6, the contents of the CPU utilization rate (%) recording column 305 are the same as those of the CPU utilization rate (%) recording column 139 of FIG. 6, the contents of the window data range recording column 311 are the same as those of the window data range recording column 141 of FIG. 6, and the contents of the data input frequency (number/second) recording column 313 are the same as those of the data input frequency (number/second) recording column 143 of FIG. 6, and as such, duplicate explanations of these columns and their contents will be omitted here.

Further, the contents of the in-window data (MB) recording column 307 are the same as those of the in-window data (MB) recording column 291 of FIG. 20, the contents of the operation network bandwidth (MB/second) recording column 309 are the same as those of the operation network bandwidth (MB/second) recording column 293 of FIG. 20, and the contents of the allowable delay time (seconds) recording column 315 are the same as those of the allowable delay time (seconds) recording column 299 of FIG. 20, and as such, duplicate explanations of these columns and their contents will be omitted here.

Furthermore, the server status table 283 shown in FIG. 21 is created on the basis of the query status table 281 that the operation management program 277 collects from the agent processing program 271 the same as the server status table 93 shown in FIG. 6.

FIG. 22 is a diagram showing an example of the configuration of the cost table 285 included in the operation management program 277 disclosed in FIG. 19.

In FIG. 22, the cost table 285 is substantially the same as the cost table 97 shown in FIG. 7, but in addition to comprising a column for recording a server ID 317, a column for recording a query ID 319, and a column for recording a CPU utilization rate (%) 321, it also comprises a column for recording the migration time (estimate) in the warm-up method 325, a column for recording the migration time (estimate) 323 divided by the migration time (estimate) in the copy method 327, and a column for recording the allowable delay time (seconds) 329. The contents of the server ID recording column 317 are the same as those of the server ID recording column 145 of FIG. 7, the contents of the query ID recording column 319 are the same as those of the query ID recording column 147 of FIG. 7, and the contents of the CPU utilization rate (%) recording column 321 are the same as those of the CPU utilization rate (%) recording column 149 of FIG. 7, and as such, duplicate explanations of these columns and their contents will be omitted here. Further, the contents of the allowable delay time (seconds) recording column 329 are the same as those of the allowable delay time (seconds) recording column 215 of FIG. 21, and the contents of the warm-up method migration time (estimate) recording column 325 are the same as those of the migration time (estimate) recording column 151 of FIG. 7, and as such, duplicate explanations of these columns and their contents will be omitted here.

"8 seconds" is stored as the migration time (estimate) in the copy method migration time (estimate) recording column 327 that is in the same row as the query ID "Q1", "4 seconds" is stored as the migration time (estimate) in the copy method migration time (estimate) recording column 327 that is in the same row as the query ID "Q2", and "12 seconds" is stored as the migration time (estimate) in the copy method migration time (estimate) recording column 327 that is in the same row as the query ID "Q3".

The following explanation relates to scale-out processing that is premised on a state in which the first server computer 5 that is running the stream data processing program 41 is the (query) migration-source server computer in the above-mentioned stream data processing system, and the second server computer 7, which will run a different stream data processing program 41 from the above-mentioned stream data processing program 41, has been newly added to this system as the (query) migration-destination server computer.

The state of the above-mentioned stream data processing system prior to the scale-out processing being carried out will be explained first.

The first server computer 5, which is the migration-source server computer, has "192.168.0.2" as its IP address, and the second server computer 7, which is the migration-destination server computer, has "192.168.0.3" as its IP address. Further, it is supposed that the stream transmission program 23 loaded into the primary storage device 17 of the stream forwarding computer 3, for example, comprises a stream transmission table 29 like that shown in FIG. 2. In the first server computer 5, which is the migration-source server computer, the stream data processing program 41 is executing a process related to the three queries (Q1, Q2, and Q3), and this stream data processing program 41, for example, comprises the query management table 57 shown in FIG. 4.

Next, the steps of the scale-out process in a case where the second server computer 7 has been added to the above-mentioned stream data processing system as a new server computer will be explained.

When the user starts the scale-out process in the above-mentioned stream data processing system, the user inputs the command to start the scale-out process via the input device 83 of the operation control computer 9, and specifies the first server computer 5 as the migration-source server computer, and specifies the newly added second server computer 7 as the migration-destination server computer. At this point, the scale-out process is executed in accordance with a processing flow that collects information related to all the queries, computes the cost (required to migrate the queries) from the collected information, and, based on the computed cost, selects the migration method that is suitable for each query, and, in addition, selects the query, which has the shortest migration time and which will make the server loads uniform, and migrates this selected query using the selected migration method.

Figure 23:
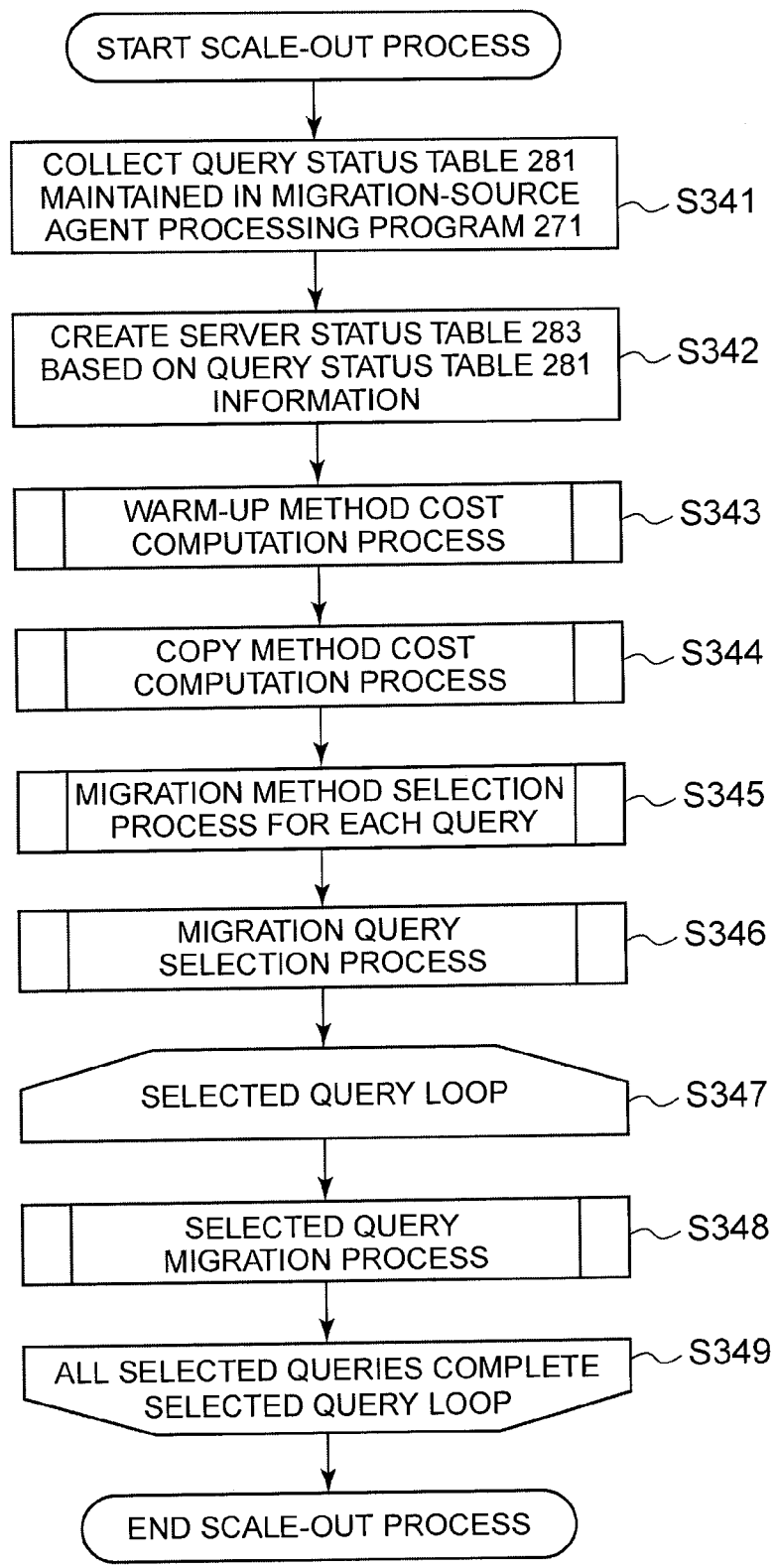
FIG. 23 is a flowchart showing an example of the steps of a scale-out process related to another embodiment of the present invention.

FIG. 23 is a flowchart showing an example of the steps of the scale-out process related to another embodiment of the present invention.

In FIG. 23, first, the operation management program 277 collects the query status table 281 included in the migration-source agent processing program 271. In this embodiment, since the first server computer 5 is specified as the migration-source server computer, the query status table 281 included in the agent processing program 271 that is monitoring the stream data processing program 41 running on the first server computer 5 is collected (Step S341). Next, the server status table 283 is created from the information in the collected query status table 281. In this embodiment, "A", which is the identifier (ID) of the first server computer 5, is stored in the server ID recording column 301 of the server status table 283 (shown in FIG. 21) with respect to the collected query status table 281 (Step S342).

When creation of the server status table 283 via the above-mentioned processing operation is complete, processes for computing the cost of migrating the query in accordance with the respective migration methods are carried out for each query. In this embodiment, the process for computing the cost of migration in accordance with the above-described warm-up method (Step S343) and the process for computing the cost of migration in accordance with the copy method (Step 344) are respectively executed using the server status table 283 created in Step S342. As used here, the process for computing the cost of migration in accordance with the copy method carried out in Step 344 refers to a process for computing for each query the cost that will be required when migrating the query using the copy method. In this embodiment, the estimated migration time required for a query migration process is used as the query migration cost.

The cost table 285 shown in FIG. 22 is created as a result of computing the costs of migration in accordance with the above-mentioned respective methods (i.e., the warm-up method and the copy method). Next, a process for selecting whether this query will be migrated using the warm-up method or whether this query will be migrated using the copy method, i.e., a migration method selection process, is executed for each query (Step S345). The migration method selection processing for each query that is carried out in Step 345 here is for selecting whether to carry out migration using the warm-up method or to carry out migration using the copy method, the migration method that is best suited to the characteristics of the individual queries is selected in this selection process. Next, the migration query selection process is executed. In this migration query selection process, migration query selection processing like that shown in FIG. 10 is executed having the migration time related to the migration method selected for each query as the estimated migration time. In this embodiment, the query Q2 and the query Q3 are selected as the migration queries (Step 346). When the above-mentioned query selection process (migration query selection process) is complete, lastly, query migration processing is executed using either the warm-up method or the copy method. That is, in the above-mentioned query selection process, either a query migration process in accordance with the warm-up method is executed for any of the selected queries, and a query migration process in accordance with the copy method is executed for the queries other than those mentioned above (Steps S347, S348, S349).

In accordance with the above, the scale-out process in the stream data processing system related to the other embodiment of the present invention, that is, the scale-out processing for executing both the process for selecting the migration method for each query and the process for selecting the query to be migrated, is completed, and the processing operation related to the query Q1 is executed in the migration-source stream data processing program 41, and the processing operations related to the query Q2 and the query Q3 are respectively executed in the migration-destination stream data processing program 41.

Figure 24:
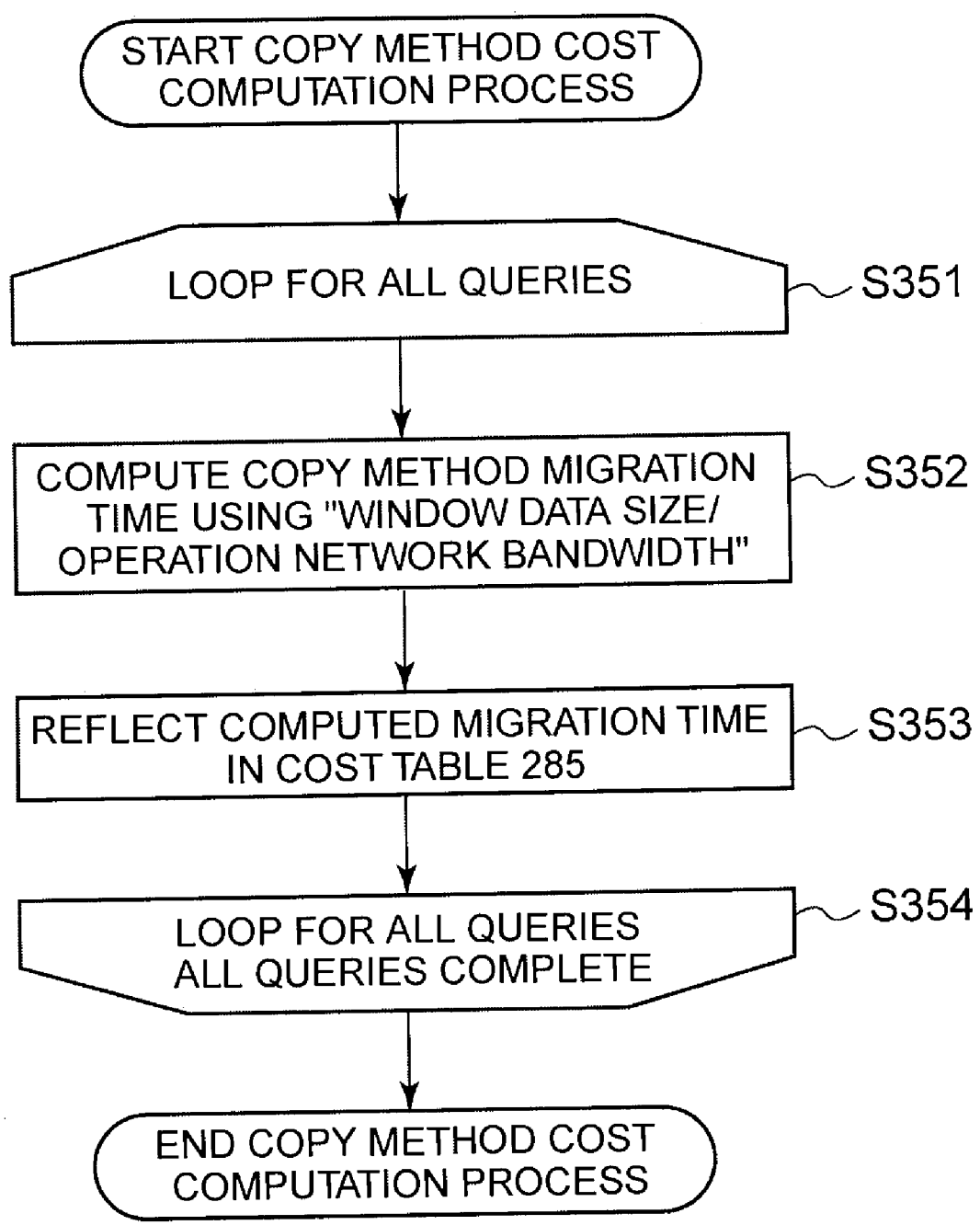
FIG. 24 is a flowchart showing an example of the processing steps of cost computation processing in the copy method.

FIG. 24 is a flowchart showing an example of the processing steps of the cost computation process in the copy method.

The copy method cost computation process shown in FIG. 24 is executed for all the queries selected as queries to be migrated. First, the cost computation process in accordance with the copy method is started for one arbitrary query (Step S351). That is, the operation management program 277 computes the migration time (estimate) of this query in accordance with the copy method by dividing the value of the in-window data (MB) recording column 307 by the value of the operation network bandwidth (MB/second) recording column 309 of the server status table 283 shown in FIG. 21 (Step S352), and carries out processing that reflects this computed migration time (estimate) in the cost table 285 shown in FIG. 22 (Step S353). At the point in time when it has been confirmed that the processing operations respectively shown in Step S352 and Step S353 have been executed for all the queries (Step S354), the series of processing operations related to the copy method cost computation process shown in FIG. 24 ends.

Figure 25:
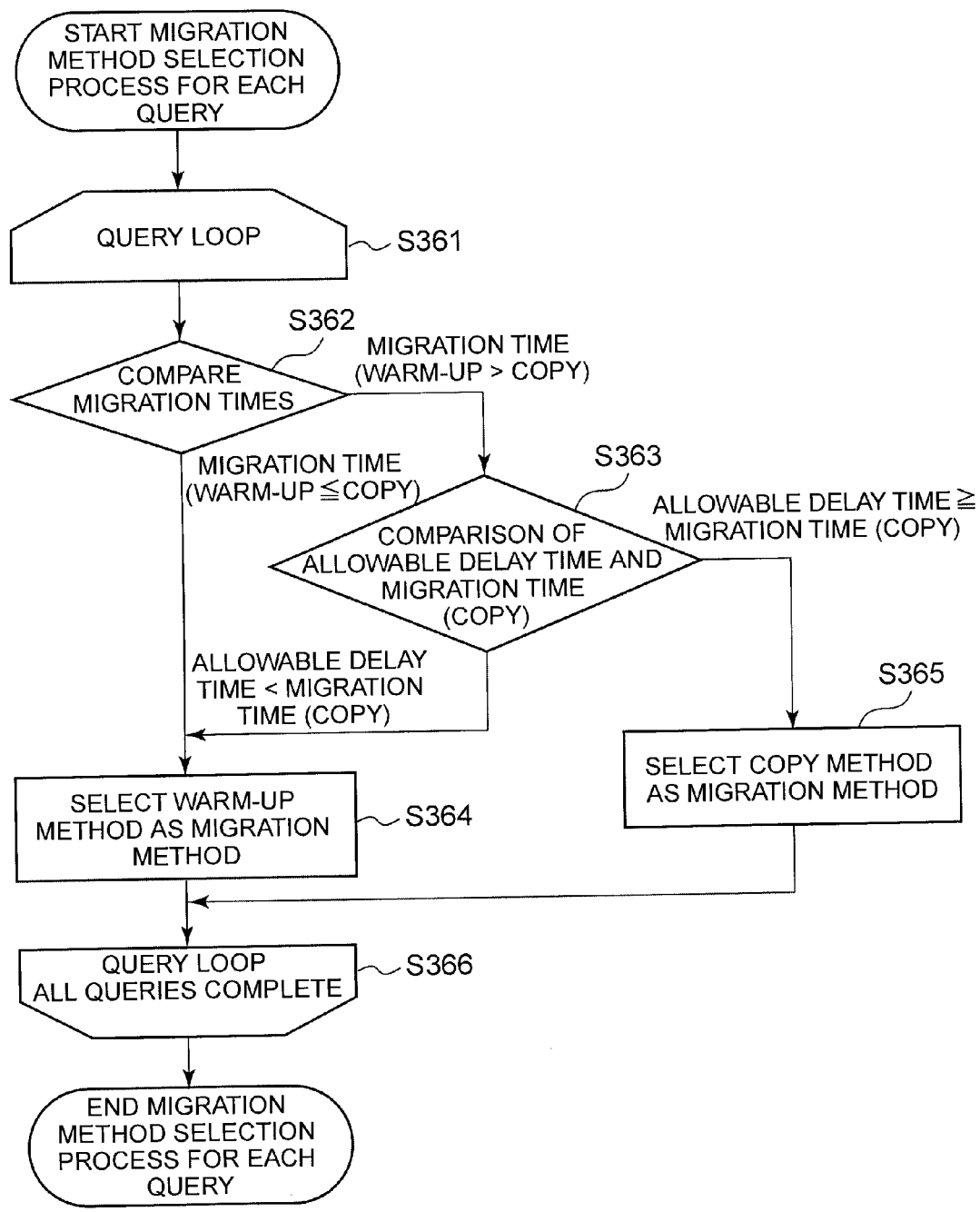
FIG. 25 is a flowchart showing an example of the processing steps of a migration method selection process pertaining to the respective queries related to another embodiment of the present invention.

FIG. 25 is a flowchart showing an example of the processing steps of the migration method selection process pertaining to the respective queries related to the other embodiment of the present invention.

In the processing steps of the migration method selection process shown in FIG. 25, a comparison of the migration times in cases that employ the respective methods (the warm-up method and the copy method) when migrating the respective queries is carried out based on the various information stored in the cost table 285 for the respective queries (Step S361). That is, first, the migration time in a case that employs the warm-up method and the migration time in a case that employs the copy method are compared (Step S362), and in a case where the result of this comparison is that the warm-up method migration time is either the same as or shorter than the copy method migration time, the warm-up method is selected as the migration method (Step S364). By contrast, in a case where the result of the above-mentioned comparison is that the copy method migration time is shorter than the warm-up method migration time, for example, the allowable delay time stored in the allowable delay time (seconds) recording column 329 of the cost table 285 shown in FIG. 22 is compared against the above-mentioned copy method migration time (Step S363).

In a case where the result of this comparison is that the allowable delay time is shorter than the copy method migration time, the warm-up method is selected as the migration method (Step S364), and in a case where the copy method migration time is the same as or shorter than the delay time, the copy method is selected as the migration method (Step S365). Since the processing related to this query must be suspended while the query is being migrated using the copy method, the user makes the determination in Step S363 as to whether or not the delay of the query-related processing is allowable by comparing the estimated migration time of the query using the copy method against the allowable delay time.

In this embodiment, since the copy method migration time for the query Q1 is shorter than the warm-up method migration time, but the copy method migration time exceeds the allowable delay time, the warm-up method is selected. Further, since the copy method migration time for the query Q2 is shorter than the warm-up method migration time, and, in addition, is also shorter than the allowable delay time, the copy method is selected, and since the warm-up method migration time for the query Q3 is shorter than the copy method migration time, the warm-up method is selected.

Figure 26:
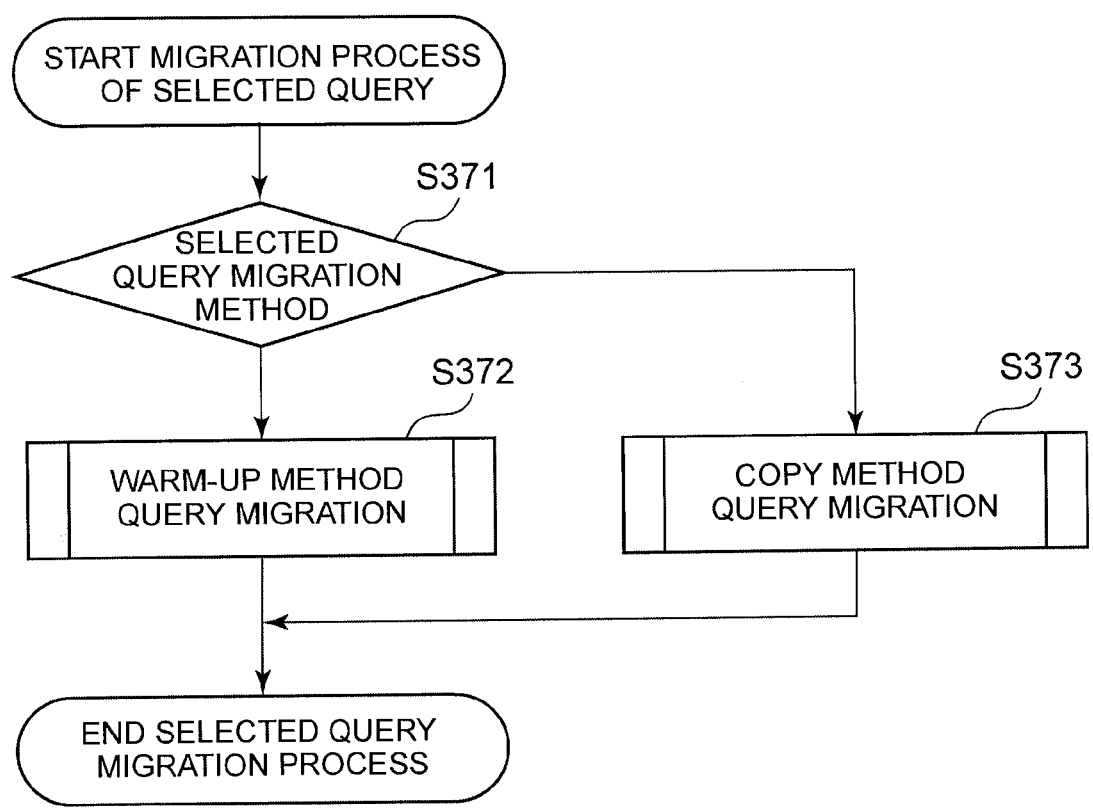
FIG. 26 is a flowchart showing an example of the processing steps when migrating a query to be migrated in accordance with the selected migration method related to another embodiment of the present invention.

FIG. 26 is a flowchart showing an example of the processing steps related to the other embodiment of the present invention when the query to be migrated is migrated using the selected migration method.

In FIG. 26, first, a check is carried out to determined whether the selected query migration method is the warm-up method or the copy method (Step S371), and when as a result of this check it is determined that the warm-up method has been selected as the migration method, the migration process for this query is executed using the warm-up method (Step S372). By contrast, when as a result of this check it is determined that the copy method has been selected as the migration method, the migration process for this query is executed using the copy method (Step S373). In this embodiment, the query Q2 is migrated using the copy method, and the query Q3 is migrated using the warm-up method.

Figure 27:
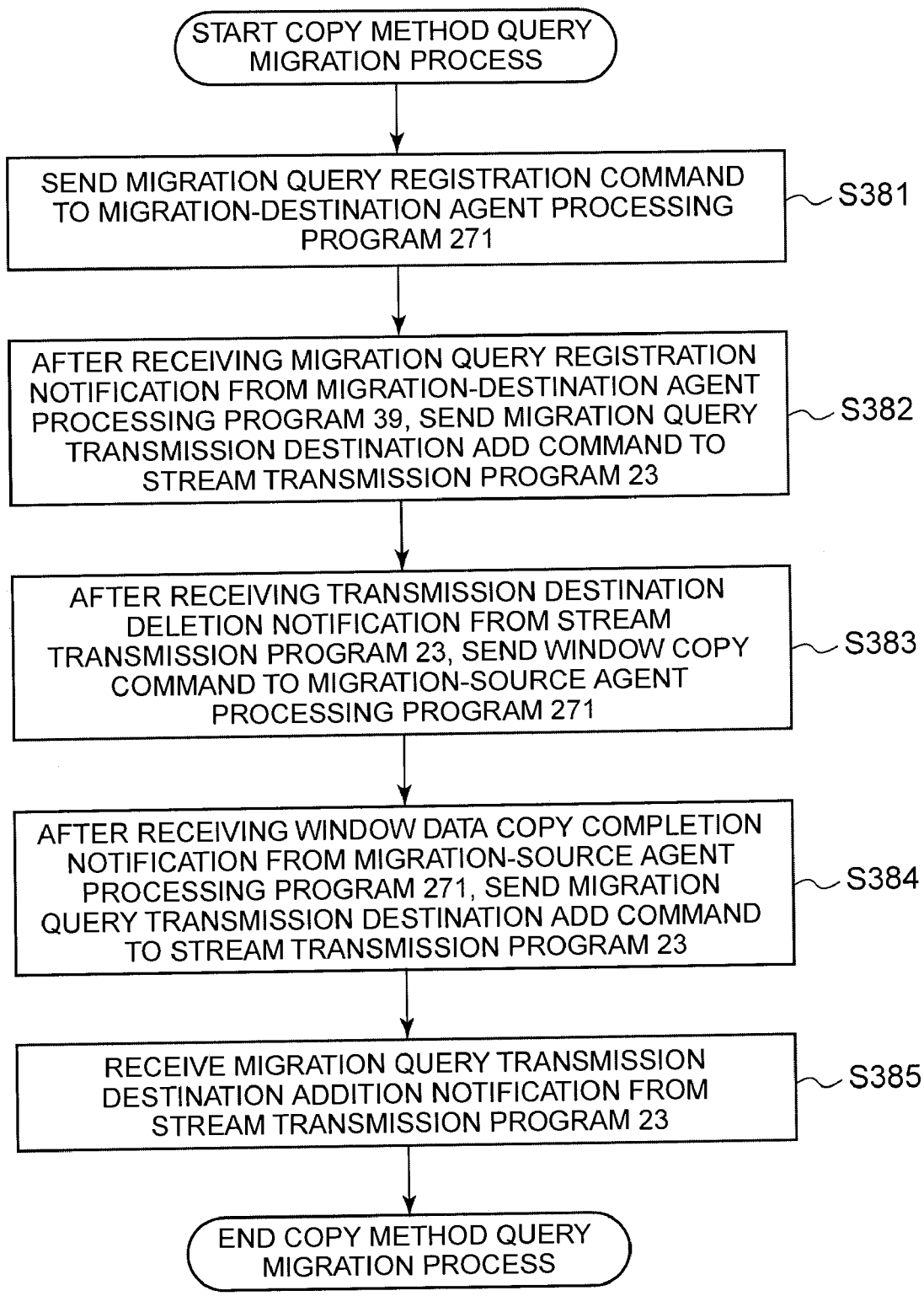
FIG. 27 is a flowchart showing an example of the processing steps of query migration processing in the copy method.

FIG. 27 is a flowchart showing an example of the processing steps of a query migration process using the copy method.

The above-mentioned query migration process using the copy method refers to a process for migrating a migration-targeted query by implementing a task that copies window data to the stream data processing program 41 that will be running on the newly added server computer (i.e., the second server computer 7).

In FIG. 27, the operation management program 277 first sends the command that registers the query to be migrated (the migration query registration command) to the migration-destination agent processing program 271 (Step S381). Upon receiving this command, the migration-destination agent processing program 271 registers the query to be migrated and sends to the operation management program 277 a notification stating that the registration of the query to be migrated has been completed, that is, a query registration completion notification. Upon receiving this query registration completion notification, the operation management program 277 sends the transmission destination delete command with respect to the above-mentioned query to be migrated to the stream transmission program 23 (of the stream forwarding computer 3) (Step S382).

Upon receiving this transmission destination delete command, the stream transmission program 23 carries out a process that prevents the stream data 15 having the stream ID that is being targeted for processing by the above-mentioned query to be migrated from being transmitted to the migration-source server computer (the first server computer 5), and sends the transmission destination deletion notification for this query to be migrated to the operation management program 277. In this embodiment, the stream transmission program 23 deletes the IP address of the first server computer that is running the migration-destination stream data processing program 41 from the transmission-destination IP address recording column 113 (shown in FIG. 2) of the stream transmission table 29. Upon receiving this transmission destination deletion notification, the operation management program 277 transmits a window copy command to the migration-source agent processing program 271. The window copy command here is a command by the migration-source agent processing program 271 for copying the window data of the query to be migrated that is being executed in the (migration-source) stream data processing program 41, which the migration-source agent processing program 271 is monitoring, to the stream data processing program 41 that will run on the newly added server computer (the second server computer 7) (Step S383).

When the copying of the window data by the migration-source agent processing program 271 is complete, the migration-source agent processing program 271 sends a notification to the operation management program 277 stating that the window data copy has been completed (a window data copy completion notification). Upon receiving this window data copy completion notification, the operation management program 277 sends the transmission destination add command to the stream transmission program 23 (Step S384). Based on this transmission destination add command, the stream transmission program 23 adds the migration-destination stream data processing program (the second server computer 7) as the transmission destination of the stream data 15 that is targeted for processing by the migration query, and sends the migration query transmission destination add notification to the operation management program 277. In accordance with this, the operation management program 277 receives this transmission destination add notification (Step S385).

In accordance with the above, the copy method query migration processing ends.

The preferred embodiment and variations thereof have been explained above, but these embodiments are merely example for explaining the present invention, and do not purport to limit the scope of the present invention to this embodiment or variations. The present invention may also be put into practice in a variety of other modes.

What is claimed is:

1. A stream data processing system comprising:
at least one first information processing apparatus comprising at least one computer configured to execute data processing based on either one or a plurality of pre-registered queries with respect to inputted stream data, and at least one second information processing apparatus comprising at least one computer configured to constitute a migration destination of any of the queries executing the data processing in the first information processing apparatus from the first information processing apparatus, and further comprising:
a query status collection unit that is configured to collect information related to a definition structure of the inputted query and an execution status of the query;
a migration cost computation unit that is configured to compute a query migration cost on a basis of information related to the definition structure and the execution status collected by the query status collection unit;

a migration query decision unit that is configured to decide a query to be migrated to the second information processing apparatus from among the queries being executed in the first information processing apparatus based on the migration cost computed by the migration cost computation unit;

a query migration execution unit that is configured to migrate the query, which has been decided to migrate by the migration query decision unit, from the first information processing apparatus to the second information processing apparatus in accordance with a pre-set query migration method;

a resource information collection unit that is configured to collect resource information related to the first information processing apparatus in which the query is registered; and the resource information comprising at least one of a CPU utilization rate of the first information processing apparatus for each of the queries and a main memory utilization rate of the first information processing apparatus for each of the queries.

2. The stream data processing system according to claim 1, wherein the information related to the query definition structure is a query window size.

3. The stream data processing system according to claim 1, wherein the information related to the query execution status is a data input frequency, which is information on a quantity of the stream data inputted per unit of time for each query.

4. The stream data processing system according to claim 3, wherein the migration cost is based on an estimated migration time, which is time required to migrate the query from the first information processing apparatus to the second information processing apparatus, and the migration cost computation unit is configured to compute the estimated migration time for each query on a basis of information related to the query definition structure and the query execution status.

5. The stream data processing system according to claim 4, wherein the migration cost computation unit is configured to compute as the estimated migration time a value of the query window size or a value obtained by dividing a value of the query window size by a value of the data input frequency.

6. The stream data processing system according to claim 1, wherein the migration query decision unit is configured to decide, based on the migration cost computed by the migration cost computation unit and the resource information, one or more queries that satisfy a specific condition as the query to be migrated from the first information processing apparatus to the second information processing apparatus.

7. The stream data processing system according to claim 6, wherein the specific condition for the migration query decision unit to select one or more queries is selection of one or more queries in which the resource information is the CPU utilization rate of the first information processing apparatus in accordance with the query, in which the estimated migration time computed by the migration cost computation unit is short, and in which a total value of the CPU utilization rates falls within a prescribed range.

8. The stream data processing system according to claim 7, wherein the migration cost computation unit is configured to compute the migration cost for each migration method for the respective queries, and the query migration method selection unit is configured to determine a migration method for each of the queries based on the migration cost computed for each query by the migration cost computation unit.

9. The stream data processing system according to claim 8, wherein for the query migration method selection unit, an optimum condition when a query, which has been determined for migration by the migration query decision unit, is migrated from the first information processing apparatus to the second information processing apparatus, is that the estimated migration time computed by the migration cost computation unit is the shortest and the query to be migrated satisfies a specific condition.

10. The stream data processing system according to claim 9 further comprising:

a window data size information collection unit that is configured to acquire information related to a data size of the window in each query.

11. The stream data processing system according to claim 10, wherein a plurality of types of query migration methods comprise:

a copy method comprising, using at least one computer, copying the stream data stored in the window of each query to the second information processing apparatus; and a warm-up method comprising, using at least one computer, copying the same stream data of a fixed period to a query that is registered in the first information processing apparatus and to a query that has been migrated to the second information processing apparatus, both of which are the same query, and suspending processing related to the query of the first information processing apparatus at a point in time when data contents in both queries match.

12. A stream data processing system comprising:

at least one first information processing apparatus comprising at least one computer configured to execute data processing based on either one or a plurality of pre-registered queries with respect to inputted stream data, and at least one second information processing apparatus comprising at least one computer configured to constitute, from the first information processing apparatus, the migration destination of any of the queries executing the data processing in the first information processing apparatus, and further comprising:

a query status collection unit that is configured to collect information related to a definition structure of the inputted query and an execution status of the query;

a migration cost computation unit that is configured to compute a query migration cost on a basis of information related to the definition structure and the execution status collected by the query status collection unit;

a query migration method selection unit that is configured to select from among a plurality of types of pre-set query migration methods a query migration method when migrating each query from the first information processing apparatus to the second information processing apparatus based on the migration cost computed by the migration cost computation unit;

a migration query decision unit that is configured to decide a query to be migrated to the second information processing apparatus from among the queries being executed on the first information processing apparatus based on the query migration method selected by the query migration method selection unit and the migration cost computed by the migration cost computation unit;

a query migration execution unit that migrates the query, which has been decided to migrate by the migration query decision unit, from the first information processing apparatus to the second information processing apparatus, in accordance with the query migration method selected by the query migration method selection unit;

a resource information collection unit that is configured to collect resource information related to the first information processing apparatus in which the query is registered; and the resource information comprising at least one of a CPU utilization rate of the first information processing apparatus for each of the queries and a main memory utilization rate of the first information processing apparatus for each of the queries.

13. The stream data processing system according to claim 12, wherein the information related to the query definition structure is a query window size.

14. The stream data processing system according to claim 12, wherein the information related to the query execution status is a data input frequency, which is information on a quantity of the stream data inputted per unit of time for each query.

15. The stream data processing system according to claim 12 further comprising:

a resource information collection unit that is configured to collect resource information related to the first information processing apparatus in which the query is registered.

16. A stream data processing method in a stream data processing system which has at least one first information processing apparatus comprising at least one computer configured to execute data processing based on one or a plurality of pre-registered queries with respect to inputted stream data, and at least one second information processing apparatus comprising at least one computer configured to constitute, from the first information processing apparatus, a migration destination of any of the queries executing the data processing in the first information processing apparatus, the stream data processing method comprising:

a first step of collecting, using at least one computer, information related to a definition structure of the inputted query and an execution status of the query;

a second step of computing, using at least one computer, a cost of migrating the query based on information related to the definition structure and the execution status collected in the first step;

a third step of deciding, using at least one computer, a query to be migrated to the second information processing apparatus from among the queries being executed in the first information processing apparatus based on the migration cost computed in the second step;

a fourth step of migrating, using at least one computer, the query, which has been decided to migrate in the third step, from the first information processing apparatus to the second information processing apparatus in use of a pre-set query migration method, and a fifth step of collecting using at least one computer resource information related to the first information processing apparatus in which the query is registered;

wherein the resource information comprises at least one of a CPU utilization rate of the first information processing apparatus for each of the queries and a main memory utilization rate of the first information processing apparatus for each of the queries.

17. A stream data processing method in a stream data processing system, which has at least one first information processing apparatus comprising at least one computer configured to execute data processing based on one or a plurality of pre-registered queries with respect to inputted stream data, and at least one second information processing apparatus computer configured to constitute, from the first information processing apparatus, a migration destination of any of the queries actually executing the data processing in the first information processing apparatus, the stream data processing method comprising:

a first step of collecting, using at least one computer, information related to a definition structure of the inputted query and an execution status of the query;

a second step of computing, using at least one computer, a cost of migrating the query based on information related to the definition structure and the execution status collected in the first step;

a third step of selecting, using at least one computer, from among a plurality of types of pre-set query migration methods a query migration method when migrating each query from the first information processing apparatus to the second information processing apparatus based on the migration cost computed in the second step;

a fourth step of deciding, using at least one computer, a query to be migrated to the second information processing apparatus from among the queries being executed in the first information processing apparatus, based on the migration cost computed in the second step and the query migration method selected in the third step;

a fifth step of migrating, using at least one computer, the query, which gas been decided to migrate in the fourth step, from the first information processing apparatus to the second information processing apparatus in accordance with the query migration method selected in the third step; and a seventh step of collecting, using at least one computer, resource information related to the first information processing apparatus in which the query is registered;

wherein the resource information comprises at least one of a CPU utilization rate of the first information processing apparatus for each of the queries and a main memory utilization rate of the first information processing apparatus for each of the queries.

18. A stream data processing method in a stream data processing system which has at least one first information processing apparatus comprising at least one computer configured to execute data processing, with respect to inputted stream data, based on one or a plurality of pre-registered queries, and at least second information processing apparatus comprising at least one computer configured to constitute, from the first information processing apparatus, a migration destination of any of the queries actually executing the data processing in the first information processing apparatus, the stream data processing method having warm-up method comprising:

a first step of deciding, using at least one computer, a query to be migrated the second information apparatus from among the queries being executed in the first information apparatus;

a second step of computing, using at least one computer, a period of sending the same stream data to query that is registered in the first information processing apparatus and to the query that has been migrated to the second information processing apparatus, both of which are the same query decided in the first step;

a third step of sending, using at least one computer, the same stream data to the query that is registered in the first information processing apparatus and to the query that has been migrated to the second information processing apparatus, both of which are the same query decided in the first step, during the period computed in the second step; and a fourth step of suspending, using at least one computer, to send the stream data to the query that is registered in the first information processing apparatus after the period computed in the second step a fifth step of collecting, using at least one computer, resource information related to the first information processing apparatus in which the query is registered;

wherein the resource information comprises at least one of a CPU utilization rate of the first information processing apparatus for each of the queries and a main memory utilization rate of the first information processing apparatus for each of the queries.

* * * * *